US010412703B2

(12) United States Patent
Forstall et al.

(10) Patent No.: US 10,412,703 B2
(45) Date of Patent: *Sep. 10, 2019

(54) LOCATION-AWARE MOBILE DEVICE

(71) Applicant: Apple Inc., Cupertino, CA (US)

(72) Inventors: Scott Forstall, Mountain View, CA (US); Gregory N. Christie, San Jose, CA (US); Robert E. Borchers, Pleasanton, CA (US); Imran A. Chaudhri, San Francisco, CA (US); Peter Henry Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,329

(22) Filed: Aug. 24, 2018

(65) Prior Publication Data
US 2019/0069268 A1 Feb. 28, 2019

Related U.S. Application Data

(63) Continuation of application No. 15/435,473, filed on Feb. 17, 2017, now Pat. No. 10,064,158, which is a
(Continued)

(51) Int. Cl.
*H04W 64/00* (2009.01)
*H04W 4/02* (2018.01)
(Continued)

(52) U.S. Cl.
CPC .......... *H04W 64/006* (2013.01); *H04L 41/22* (2013.01); *H04L 67/18* (2013.01); *H04M 1/2477* (2013.01);
(Continued)

(58) Field of Classification Search
USPC .......................................... 455/456.1–456.6
See application file for complete search history.

(56) References Cited

U.S. PATENT DOCUMENTS 4,644,351 A    2/1987  Zabarsky et al.
4,903,212 A    2/1990  Yokouchi et al.
(Continued)

FOREIGN PATENT DOCUMENTS

BR    9904979     12/2000
CA    2163215     11/1994
(Continued)

OTHER PUBLICATIONS

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.
(Continued)

*Primary Examiner* — Joshua L Schwartz
(74) *Attorney, Agent, or Firm* — Jaffery Watson Mendonsa & Hamilton LLP

(57) ABSTRACT

One or more location-based clients can be activated on a mobile device for providing location-based services. The location-based clients can be provided with information (e.g., presets, defaults) related to the current location and/or mode of the mobile device. The information can be obtained from one or more network resources. In some implementations, a number of location-based clients can run concurrently on the mobile device and share information.

21 Claims, 6 Drawing Sheets

Related U.S. Application Data continuation of application No. 15/142,343, filed on Apr. 29, 2016, now Pat. No. 9,578,621, which is a continuation of application No. 14/745,638, filed on Jun. 22, 2015, now Pat. No. 9,414,198, which is a continuation of application No. 12/163,858, filed on Jun. 27, 2008, now Pat. No. 9,066,199.

(60) Provisional application No. 60/946,774, filed on Jun. 28, 2007.

(51) Int. Cl.
  *H04M 1/247* (2006.01)
  *H04L 29/08* (2006.01)
  *H04M 1/725* (2006.01)
  *H04W 4/021* (2018.01)
  *H04L 12/24* (2006.01)
  *H04W 4/40* (2018.01)
  *H04W 4/04* (2009.01)

(52) U.S. Cl.
  CPC ......... *H04M 1/72572* (2013.01); *H04W 4/02* (2013.01); *H04W 4/021* (2013.01); *H04W 4/025* (2013.01); *H04W 4/027* (2013.01); *H04W 4/046* (2013.01); *H04W 4/40* (2018.02)

(56) References Cited

U.S. PATENT DOCUMENTS

| | | |
|---|---|---|
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare et al. |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,440,484 A | 8/1995 | Kao |
| 5,463,725 A | 10/1995 | Henkel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss et al. |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw et al. |
| 5,630,206 A | 5/1997 | Urban et al. |
| 5,636,245 A | 6/1997 | Ernst et al. |
| 5,642,303 A | 6/1997 | Small et al. |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,269 A | 11/1997 | Norris |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,727,057 A | 3/1998 | Emery et al. |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,748,148 A | 5/1998 | Heiser et al. |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,771,280 A | 6/1998 | Johnson |
| 5,774,824 A | 6/1998 | Streit et al. |
| 5,774,829 A | 6/1998 | Cisneros et al. |
| 5,793,630 A | 8/1998 | Theimer et al. |
| 5,796,365 A | 8/1998 | Lewis et al. |
| 5,796,613 A | 8/1998 | Kato et al. |
| 5,799,061 A | 8/1998 | Melcher et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon et al. |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone et al. |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter et al. |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,938,721 A | 8/1999 | Dussell et al. |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan et al. |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |

(56) References Cited

U.S. PATENT DOCUMENTS

| | | |
|---|---|---|
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,018,697 A | 1/2000 | Morimoto et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison et al. |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins et al. |
| 6,092,076 A | 7/2000 | McDonough et al. |
| 6,094,607 A | 7/2000 | Diesel |
| 6,101,443 A | 8/2000 | Kato et al. |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A | 9/2000 | Want et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker et al. |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,334,090 B1 | 12/2001 | Fujii |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,406 B1 | 3/2002 | Lanzl |
| 6,353,743 B1 | 3/2002 | Karmel |
| 6,353,837 B1 | 3/2002 | Blumenau |
| 6,356,761 B1 | 3/2002 | Huttunen et al. |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,810 B1 | 4/2002 | Geiger et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,027 B1 | 6/2002 | Xu et al. |
| 6,401,032 B1 | 6/2002 | Jamison et al. |
| 6,405,034 B1 | 6/2002 | Tijerino |
| 6,405,123 B1 | 6/2002 | Rennard et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,446,004 B1 | 9/2002 | Cao et al. |
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter et al. |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,502,033 B1 | 12/2002 | Phuyal |
| 6,505,046 B1 | 1/2003 | Baker |
| 6,505,048 B1 | 1/2003 | Moles et al. |

(56) References Cited

U.S. PATENT DOCUMENTS

| | | |
|---|---|---|
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,519,571 B1 | 2/2003 | Guheen et al. |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,545,638 B2 | 4/2003 | Sladen |
| 6,546,336 B1 | 4/2003 | Matsuoka et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,574,550 B2 | 6/2003 | Hashida |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 | 11/2003 | Brodie et al. |
| 6,647,257 B2 | 11/2003 | Owensby |
| 6,650,902 B1 | 11/2003 | Richton |
| 6,650,997 B2 | 11/2003 | Funk |
| 6,662,016 B1 | 12/2003 | Buckham et al. |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,678,516 B2 | 1/2004 | Nordman et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,714,791 B2 | 3/2004 | Friedman |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,732,047 B1 | 5/2004 | de Silva |
| 6,738,808 B1 | 5/2004 | Zellner et al. |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,766,245 B2 | 7/2004 | Padmanabhan |
| 6,781,575 B1 | 8/2004 | Hawkins et al. |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 | 10/2004 | Walters et al. |
| 6,810,323 B1 | 10/2004 | Bullock et al. |
| 6,813,501 B2 | 11/2004 | Kinnunen et al. |
| 6,813,503 B1 | 11/2004 | Zillikens et al. |
| 6,813,582 B2 | 11/2004 | Levi et al. |
| 6,816,782 B1 | 11/2004 | Walters et al. |
| 6,819,919 B1 | 11/2004 | Tanaka |
| 6,823,188 B1 | 11/2004 | Stern |
| 6,834,195 B2 | 12/2004 | Brandenberg et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,859,149 B1 | 2/2005 | Ohta |
| 6,865,483 B1 | 3/2005 | Cook, III et al. |
| 6,868,074 B1 | 3/2005 | Hanson |
| 6,871,144 B1 | 3/2005 | Lee |
| 6,879,838 B2 | 4/2005 | Rankin et al. |
| 6,882,313 B1 | 4/2005 | Fan et al. |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,931,322 B2 | 8/2005 | Jung et al. |
| 6,933,841 B2 | 8/2005 | Muramatsu et al. |
| 6,941,222 B2 | 9/2005 | Yano et al. |
| 6,944,447 B2 | 9/2005 | Portman et al. |
| 6,948,656 B2 | 9/2005 | Williams |
| 6,950,746 B2 | 9/2005 | Yano et al. |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,975,959 B2 | 12/2005 | Dietrich et al. |
| 6,980,909 B2 | 12/2005 | Root et al. |
| 6,990,495 B1 | 1/2006 | Grason et al. |
| 6,999,779 B1 | 2/2006 | Hashimoto |
| 7,003,289 B1 | 2/2006 | Kolls |
| 7,009,556 B2 | 3/2006 | Stewart |
| 7,031,725 B2 | 4/2006 | Rorabaugh |
| 7,044,372 B2 | 5/2006 | Okuda et al. |
| 7,058,594 B2 | 6/2006 | Stewart |
| 7,069,319 B2 | 6/2006 | Zellner et al. |
| 7,076,255 B2 | 7/2006 | Parupudi et al. |
| 7,082,365 B2 | 7/2006 | Sheha et al. |
| 7,089,264 B1 | 8/2006 | Guido et al. |
| 7,096,029 B1 | 8/2006 | Parupudi et al. |
| 7,096,030 B2 | 8/2006 | Huomo |
| 7,103,470 B2 | 9/2006 | Mintz |
| 7,103,472 B2 | 9/2006 | Itabashi |
| 7,117,015 B2 | 10/2006 | Scheinert et al. |
| 7,120,469 B1 | 10/2006 | Urakawa |
| 7,123,189 B2 | 10/2006 | Lalik et al. |
| 7,123,926 B2 | 10/2006 | Himmelstein |
| 7,130,630 B1 | 10/2006 | Enzmann et al. |
| 7,130,743 B2 | 10/2006 | Kudo et al. |
| 7,136,853 B1 | 11/2006 | Kohda et al. |
| 7,146,298 B2 | 12/2006 | Matomedi et al. |
| 7,149,503 B2 | 12/2006 | Aarnio et al. |
| 7,151,921 B2 | 12/2006 | Otsuka |
| 7,165,725 B2 | 1/2007 | Casey |
| 7,171,190 B2 | 1/2007 | Ye et al. |
| 7,181,189 B2 | 2/2007 | Hotta et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,222,293 B1 | 5/2007 | Zapiec et al. |
| 7,236,883 B2 | 6/2007 | Garin et al. |
| 7,254,481 B2 | 8/2007 | Yamada et al. |
| 7,256,711 B2 | 8/2007 | Sheha et al. |
| 7,257,392 B2 | 8/2007 | Tang et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,403 B2 | 9/2007 | Creamer et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,286,933 B2 | 10/2007 | Cho |
| 7,295,556 B2 | 11/2007 | Roese et al. |

(56) References Cited

U.S. PATENT DOCUMENTS

| | | |
|---|---|---|
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti et al. |
| 7,313,405 B2 | 12/2007 | Tanabe |
| 7,313,467 B2 | 12/2007 | Breed et al. |
| 7,319,412 B1 | 1/2008 | Coppinger et al. |
| 7,336,928 B2 | 2/2008 | Paalasmaa et al. |
| 7,336,949 B2 | 2/2008 | Nasielski |
| 7,339,496 B2 | 3/2008 | Endo et al. |
| 7,343,564 B2 | 3/2008 | Othmer |
| 7,349,706 B2 | 3/2008 | Kim et al. |
| 7,353,034 B2 | 4/2008 | Haney |
| 7,359,713 B1 | 4/2008 | Tiwari |
| 7,370,283 B2 | 5/2008 | Othmer |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B2 | 9/2008 | Kemper et al. |
| 7,433,694 B2 | 10/2008 | Morgan et al. |
| 7,440,842 B1 | 10/2008 | Vorona |
| 7,441,203 B2 | 10/2008 | Othmer et al. |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,496,444 B1 | 2/2009 | Fried et al. |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,536,388 B2 | 5/2009 | Jung et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,593,740 B2 | 9/2009 | Crowley et al. |
| 7,593,991 B2 | 9/2009 | Friedman et al. |
| 7,596,450 B2 | 9/2009 | Hong |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagata et al. |
| 7,683,893 B2 | 3/2010 | Kim et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,729,691 B2 | 6/2010 | Newville |
| 7,739,040 B2 | 6/2010 | Horvitz |
| 7,742,774 B2 | 6/2010 | Oh et al. |
| 7,743,074 B1 | 6/2010 | Parupudi et al. |
| 7,756,639 B2 | 7/2010 | Colley et al. |
| 7,768,395 B2 | 8/2010 | Gold |
| 7,783,421 B2 | 8/2010 | Arai et al. |
| 7,792,273 B2 | 9/2010 | Fano et al. |
| 7,811,203 B2 | 10/2010 | Unuma et al. |
| 7,817,033 B2 | 10/2010 | Motoyama |
| 7,818,116 B1 | 10/2010 | Nesbitt |
| 7,822,547 B2 | 10/2010 | Lindroos |
| 7,840,347 B2 | 11/2010 | Noguchi |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,089 B1 | 2/2011 | Fujisaki |
| 7,890,123 B2 | 2/2011 | Granito et al. |
| 7,929,010 B2 | 4/2011 | Narasimhan |
| 7,933,612 B2 | 4/2011 | Counts et al. |
| 7,933,929 B1 | 4/2011 | McClendon et al. |
| 7,941,188 B2 | 5/2011 | Jung et al. |
| 7,962,280 B2 | 6/2011 | Kindo et al. |
| 7,970,418 B2 | 6/2011 | Schmidt et al. |
| 7,979,350 B1 | 7/2011 | Carion |
| 7,991,432 B2 | 8/2011 | Silverbrook et al. |
| 8,031,050 B2 | 10/2011 | Johnson |
| 8,036,630 B2 | 10/2011 | Park et al. |
| 8,036,634 B2 | 10/2011 | DiMeo et al. |
| 8,046,009 B2 | 10/2011 | Bodmer et al. |
| RE42,927 E | 11/2011 | Want et al. |
| 8,073,565 B2 | 12/2011 | Johnson |
| 8,082,094 B2 | 12/2011 | Gao |
| 8,095,152 B2 | 1/2012 | Sheha et al. |
| 8,108,144 B2 | 1/2012 | Forstall et al. |
| 8,229,458 B2 | 7/2012 | Busch |
| 8,250,634 B2 | 8/2012 | Agarwal et al. |
| 8,332,878 B2 | 12/2012 | Harm |
| 8,380,982 B2 | 2/2013 | Miyabayashi et al. |
| 8,385,943 B1 | 2/2013 | Han et al. |
| 8,385,946 B2 | 2/2013 | Forstall et al. |
| 8,386,655 B2 | 2/2013 | Luers |
| 8,478,307 B1 | 7/2013 | Hayes |
| 8,489,121 B2 | 7/2013 | Liang |
| 8,538,685 B2 | 9/2013 | Johnson |
| 8,639,267 B2 | 1/2014 | Johnson |
| 8,762,056 B2 | 6/2014 | Forstall et al. |
| 8,774,825 B2 | 7/2014 | Forstall et al. |
| 8,963,686 B2 | 2/2015 | Johnson |
| 9,066,199 B2 | 6/2015 | Forstall et al. |
| 9,100,793 B2 | 8/2015 | Johnson |
| 9,109,904 B2 | 8/2015 | Forstall et al. |
| 9,250,092 B2 | 2/2016 | Blumenberg et al. |
| 9,310,206 B2 | 4/2016 | Forshall et al. |
| 9,317,867 B2 | 4/2016 | Johnson |
| 9,414,198 B2 | 8/2016 | Forstall et al. |
| 9,578,621 B2 | 7/2017 | Forstall et al. |
| 2001/0018349 A1 | 8/2001 | Kinnunen et al. |
| 2001/0043148 A1 | 11/2001 | Stewart |
| 2001/0046884 A1 | 11/2001 | Yoshioka |
| 2002/0026289 A1 | 2/2002 | Kuzunuki et al. |
| 2002/0030698 A1 | 3/2002 | Baur et al. |
| 2002/0032035 A1 | 3/2002 | Teshima |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0055373 A1 | 5/2002 | King et al. |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0091632 A1 | 7/2002 | Turock et al. |
| 2002/0091991 A1 | 7/2002 | Castro |
| 2002/0095486 A1 | 7/2002 | Bahl |
| 2002/0098849 A1 | 7/2002 | Bloebaum et al. |
| 2002/0118112 A1 | 8/2002 | Lang |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0140560 A1 | 10/2002 | Altman et al. |
| 2002/0160815 A1 | 10/2002 | Patel et al. |
| 2002/0164999 A1 | 11/2002 | Johnson |
| 2002/0167442 A1 | 11/2002 | Taylor |
| 2002/0173905 A1 | 11/2002 | Jin et al. |
| 2002/0183927 A1 | 12/2002 | Odamura |
| 2003/0001827 A1 | 1/2003 | Yokota et al. |
| 2003/0006914 A1 | 1/2003 | Todoriki et al. |
| 2003/0008662 A1 | 1/2003 | Stern et al. |
| 2003/0014181 A1 | 1/2003 | Myr |
| 2003/0016804 A1 | 1/2003 | Sheha et al. |
| 2003/0032404 A1 | 2/2003 | Wager et al. |

(56) References Cited

U.S. PATENT DOCUMENTS

| | | |
|---|---|---|
| 2003/0055560 A1 | 3/2003 | Phillips et al. |
| 2003/0060211 A1 | 3/2003 | Chern et al. |
| 2003/0060212 A1 | 3/2003 | Thomas |
| 2003/0060215 A1 | 3/2003 | Graham |
| 2003/0060973 A1 | 3/2003 | Mathews et al. |
| 2003/0060976 A1 | 3/2003 | Sato et al. |
| 2003/0065934 A1 | 4/2003 | Angelo et al. |
| 2003/0069029 A1 | 4/2003 | Dowling et al. |
| 2003/0069683 A1 | 4/2003 | Lapidot et al. |
| 2003/0078054 A1 | 4/2003 | Okuda |
| 2003/0078055 A1 | 4/2003 | Smith et al. |
| 2003/0078057 A1 | 4/2003 | Watanabe et al. |
| 2003/0093217 A1 | 5/2003 | Petzold et al. |
| 2003/0096620 A1 | 5/2003 | Ozturk et al. |
| 2003/0100326 A1 | 5/2003 | Grube et al. |
| 2003/0100334 A1 | 5/2003 | Mazzara, Jr. |
| 2003/0101225 A1 | 5/2003 | Han et al. |
| 2003/0105826 A1 | 6/2003 | Mayraz |
| 2003/0120423 A1 | 6/2003 | Cochlovius et al. |
| 2003/0134657 A1 | 7/2003 | Norta et al. |
| 2003/0139150 A1 | 7/2003 | Rodriguez et al. |
| 2003/0140136 A1 | 7/2003 | Nakamura |
| 2003/0144793 A1 | 7/2003 | Melaku et al. |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2003/0229446 A1 | 12/2003 | Boscamp et al. |
| 2003/0236106 A1 | 12/2003 | Master et al. |
| 2004/0010358 A1 | 1/2004 | Oesterling et al. |
| 2004/0019582 A1 | 1/2004 | Brown |
| 2004/0036649 A1 | 2/2004 | Taylor |
| 2004/0054428 A1 | 3/2004 | Sheha et al. |
| 2004/0059502 A1 | 3/2004 | Levi et al. |
| 2004/0068439 A1 | 4/2004 | Elgrably |
| 2004/0068634 A1 | 4/2004 | Otsuka |
| 2004/0072557 A1 | 4/2004 | Paila et al. |
| 2004/0072577 A1 | 4/2004 | Myllymaki et al. |
| 2004/0073361 A1 | 4/2004 | Tzamaloukas et al. |
| 2004/0082351 A1 | 4/2004 | Westman |
| 2004/0083050 A1 | 4/2004 | Biyani |
| 2004/0093155 A1 | 5/2004 | Simonds |
| 2004/0093392 A1 | 5/2004 | Nagamatsu et al. |
| 2004/0093566 A1 | 5/2004 | McElligott |
| 2004/0098175 A1 | 5/2004 | Said et al. |
| 2004/0104842 A1 | 6/2004 | Drury et al. |
| 2004/0110488 A1 | 6/2004 | Komsi |
| 2004/0110515 A1 | 6/2004 | Blumberg et al. |
| 2004/0128066 A1 | 7/2004 | Kudo et al. |
| 2004/0128067 A1 | 7/2004 | Smith |
| 2004/0137893 A1 | 7/2004 | Muthuswamy et al. |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0180669 A1 | 9/2004 | Kall |
| 2004/0192299 A1 | 9/2004 | Wilson et al. |
| 2004/0192351 A1 | 9/2004 | Duncan |
| 2004/0198335 A1 | 10/2004 | Campen |
| 2004/0198379 A1 | 10/2004 | Magee et al. |
| 2004/0198397 A1 | 10/2004 | Weiss |
| 2004/0203569 A1 | 10/2004 | Jijina et al. |
| 2004/0203746 A1 | 10/2004 | Knauerhase et al. |
| 2004/0203836 A1 | 10/2004 | Gorday et al. |
| 2004/0203880 A1 | 10/2004 | Riley |
| 2004/0203909 A1 | 10/2004 | Koster |
| 2004/0204842 A1 | 10/2004 | Shinozaki |
| 2004/0215707 A1 | 10/2004 | Fujita et al. |
| 2004/0225436 A1 | 11/2004 | Yoshihashi |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260457 A1 | 12/2004 | Kawase et al. |
| 2004/0260939 A1 | 12/2004 | Ichikawa et al. |
| 2004/0263084 A1 | 12/2004 | Mor et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0009511 A1 | 1/2005 | Bostrom et al. |
| 2005/0020223 A1 | 1/2005 | Ellis et al. |
| 2005/0020315 A1 | 1/2005 | Robertson et al. |
| 2005/0027442 A1 | 2/2005 | Kelley et al. |
| 2005/0033509 A1 | 2/2005 | Clapper |
| 2005/0033515 A1 | 2/2005 | Bozzone |
| 2005/0037781 A1 | 2/2005 | Ozugur et al. |
| 2005/0039140 A1 | 2/2005 | Chen |
| 2005/0046584 A1 | 3/2005 | Breed |
| 2005/0071078 A1 | 3/2005 | Yamada et al. |
| 2005/0071702 A1 | 3/2005 | Morisawa |
| 2005/0073443 A1 | 4/2005 | Sheha et al. |
| 2005/0075116 A1 | 4/2005 | Laird |
| 2005/0085272 A1 | 4/2005 | Anderson et al. |
| 2005/0091408 A1 | 4/2005 | Parupudi et al. |
| 2005/0096840 A1 | 5/2005 | Simske |
| 2005/0114021 A1 | 5/2005 | Krull et al. |
| 2005/0130677 A1 | 6/2005 | Meunier et al. |
| 2005/0134440 A1 | 6/2005 | Breed |
| 2005/0134578 A1 | 6/2005 | Chambers et al. |
| 2005/0149250 A1 | 7/2005 | Isaac |
| 2005/0153681 A1 | 7/2005 | Hanson |
| 2005/0176411 A1 | 8/2005 | Taya |
| 2005/0186954 A1 | 8/2005 | Kenney |
| 2005/0190789 A1 | 9/2005 | Salkini et al. |
| 2005/0192025 A1 | 9/2005 | Kaplan |
| 2005/0197767 A1 | 9/2005 | Nortrup |
| 2005/0203698 A1 | 9/2005 | Lee |
| 2005/0216184 A1 | 9/2005 | Ehlers |
| 2005/0221799 A1 | 10/2005 | Tervo et al. |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0222763 A1 | 10/2005 | Uyeki |
| 2005/0227709 A1 | 10/2005 | Chang et al. |
| 2005/0228553 A1 | 10/2005 | Tryon |
| 2005/0228860 A1 | 10/2005 | Hamynen et al. |
| 2005/0234637 A1 | 10/2005 | Obradovich et al. |
| 2005/0239477 A1 | 10/2005 | Kim et al. |
| 2005/0250440 A1 | 11/2005 | Zhou et al. |
| 2005/0256639 A1 | 11/2005 | Aleksic et al. |
| 2005/0267676 A1 | 12/2005 | Nezu et al. |
| 2005/0272473 A1 | 12/2005 | Sheena et al. |
| 2005/0286421 A1 | 12/2005 | Janacek |
| 2006/0009908 A1 | 1/2006 | Tomita et al. |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0026536 A1 | 2/2006 | Hotelling et al. |
| 2006/0029109 A1 | 2/2006 | Moran |
| 2006/0038719 A1 | 2/2006 | Pande et al. |
| 2006/0041374 A1 | 2/2006 | Inoue |
| 2006/0041377 A1 | 2/2006 | Jung et al. |
| 2006/0041378 A1 | 2/2006 | Cheng et al. |
| 2006/0056388 A1 | 3/2006 | Livingwood |
| 2006/0058955 A1 | 3/2006 | Mehren |
| 2006/0063539 A1 | 3/2006 | Beyer, Jr. |
| 2006/0064239 A1 | 3/2006 | Ishii |
| 2006/0068809 A1 | 3/2006 | Wengler et al. |
| 2006/0069503 A1 | 3/2006 | Suomela |
| 2006/0072542 A1 | 4/2006 | Sinnreich et al. |
| 2006/0084414 A1 | 4/2006 | Alberth, Jr. et al. |
| 2006/0085392 A1 | 4/2006 | Wang et al. |
| 2006/0094353 A1 | 5/2006 | Neilsen et al. |
| 2006/0101005 A1 | 5/2006 | Yang et al. |
| 2006/0111122 A1 | 5/2006 | Carlson et al. |
| 2006/0116137 A1 | 6/2006 | Jung |
| 2006/0116965 A1 | 6/2006 | Kudo et al. |
| 2006/0148463 A1 | 7/2006 | Zhu et al. |
| 2006/0149461 A1 | 7/2006 | Rowley |
| 2006/0150119 A1 | 7/2006 | Chesnais et al. |
| 2006/0156209 A1 | 7/2006 | Matsuura et al. |
| 2006/0166679 A1 | 7/2006 | Karaoguz et al. |
| 2006/0168300 A1 | 7/2006 | An et al. |

(56) References Cited

U.S. PATENT DOCUMENTS

| | | |
|---|---|---|
| 2006/0172769 A1 | 8/2006 | Oh |
| 2006/0172778 A1 | 8/2006 | Sundararajan et al. |
| 2006/0179114 A1 | 8/2006 | Deeds |
| 2006/0180649 A1 | 8/2006 | Casey |
| 2006/0183486 A1 | 8/2006 | Mullen |
| 2006/0184320 A1 | 8/2006 | Hong |
| 2006/0184978 A1 | 8/2006 | Casey |
| 2006/0195481 A1 | 8/2006 | Arrouye et al. |
| 2006/0199567 A1 | 9/2006 | Alston |
| 2006/0199612 A1 | 9/2006 | Beyer et al. |
| 2006/0202819 A1 | 9/2006 | Adamczyk et al. |
| 2006/0206264 A1 | 9/2006 | Rasmussen |
| 2006/0211453 A1 | 9/2006 | Schick |
| 2006/0218209 A1 | 9/2006 | Arrouye et al. |
| 2006/0223518 A1 | 10/2006 | Haney |
| 2006/0227047 A1 | 10/2006 | Rosenberg |
| 2006/0229802 A1 | 10/2006 | Vertelney et al. |
| 2006/0229889 A1 | 10/2006 | Hodjat et al. |
| 2006/0247855 A1 | 11/2006 | de Silva et al. |
| 2006/0251034 A1 | 11/2006 | Park |
| 2006/0270421 A1 | 11/2006 | Phillips et al. |
| 2006/0271280 A1 | 11/2006 | O'Clair |
| 2006/0284767 A1 | 12/2006 | Taylor |
| 2006/0286971 A1 | 12/2006 | Maly et al. |
| 2006/0287824 A1 | 12/2006 | Lin |
| 2006/0291639 A1 | 12/2006 | Radziewicz et al. |
| 2006/0293029 A1 | 12/2006 | Jha et al. |
| 2006/0293083 A1 | 12/2006 | Bowen |
| 2007/0001875 A1 | 1/2007 | Taylor |
| 2007/0003040 A1 | 1/2007 | Radziewicz et al. |
| 2007/0005188 A1 | 1/2007 | Johnson |
| 2007/0005233 A1 | 1/2007 | Pinkus et al. |
| 2007/0006098 A1 | 1/2007 | Krumm et al. |
| 2007/0008515 A1 | 1/2007 | Otani et al. |
| 2007/0010942 A1 | 1/2007 | Bill |
| 2007/0016362 A1 | 1/2007 | Nelson |
| 2007/0027614 A1 | 2/2007 | Reeser et al. |
| 2007/0027628 A1 | 2/2007 | Geelen |
| 2007/0038364 A1 | 2/2007 | Lee et al. |
| 2007/0038369 A1 | 2/2007 | Devries et al. |
| 2007/0042790 A1 | 2/2007 | Mohi et al. |
| 2007/0055684 A1 | 3/2007 | Stevens |
| 2007/0060328 A1 | 3/2007 | Zrike et al. |
| 2007/0061245 A1 | 3/2007 | Ramer et al. |
| 2007/0061301 A1 | 3/2007 | Ramer et al. |
| 2007/0061363 A1 | 3/2007 | Ramer et al. |
| 2007/0071114 A1 | 3/2007 | Sanderford et al. |
| 2007/0073480 A1 | 3/2007 | Singh |
| 2007/0073719 A1 | 3/2007 | Ramer et al. |
| 2007/0087726 A1 | 4/2007 | McGary et al. |
| 2007/0093258 A1 | 4/2007 | Steenstra et al. |
| 2007/0093955 A1 | 4/2007 | Hughes |
| 2007/0106465 A1 | 5/2007 | Adam et al. |
| 2007/0106466 A1 | 5/2007 | Noguchi |
| 2007/0109323 A1 | 5/2007 | Nakashima |
| 2007/0115868 A1 | 5/2007 | Chen et al. |
| 2007/0123280 A1 | 5/2007 | McGary et al. |
| 2007/0124043 A1 | 5/2007 | Ayoub et al. |
| 2007/0124058 A1 | 5/2007 | Kitagawa et al. |
| 2007/0124066 A1 | 5/2007 | Kikuchi et al. |
| 2007/0127439 A1 | 6/2007 | Stein |
| 2007/0127661 A1 | 6/2007 | Didcock |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0142026 A1 | 6/2007 | Kuz et al. |
| 2007/0146342 A1 | 6/2007 | Medler et al. |
| 2007/0149212 A1 | 6/2007 | Gupta et al. |
| 2007/0150174 A1 | 6/2007 | Seymour et al. |
| 2007/0150192 A1 | 6/2007 | Wakamatsu et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0155360 A1 | 7/2007 | An |
| 2007/0155404 A1 | 7/2007 | Yamane et al. |
| 2007/0156326 A1 | 7/2007 | Nesbitt |
| 2007/0156337 A1 | 7/2007 | Yanni |
| 2007/0162224 A1 | 7/2007 | Luo |
| 2007/0179854 A1 | 8/2007 | Ziv et al. |
| 2007/0184855 A1 | 8/2007 | Klassen |
| 2007/0191029 A1 | 8/2007 | Zarem et al. |
| 2007/0198304 A1 | 8/2007 | Cohen et al. |
| 2007/0200713 A1 | 8/2007 | Weber et al. |
| 2007/0202887 A1 | 8/2007 | Counts et al. |
| 2007/0204162 A1 | 8/2007 | Rodriguez |
| 2007/0204218 A1 | 8/2007 | Weber et al. |
| 2007/0206730 A1 | 9/2007 | Polk |
| 2007/0208492 A1 | 9/2007 | Downs et al. |
| 2007/0208497 A1 | 9/2007 | Downs et al. |
| 2007/0208498 A1 | 9/2007 | Barker et al. |
| 2007/0208507 A1 | 9/2007 | Gotoh |
| 2007/0218925 A1 | 9/2007 | Islam et al. |
| 2007/0219706 A1 | 9/2007 | Sheynblat |
| 2007/0219708 A1 | 9/2007 | Brasche et al. |
| 2007/0229549 A1 | 10/2007 | Dicke et al. |
| 2007/0232272 A1 | 10/2007 | Gonsalves et al. |
| 2007/0232326 A1 | 10/2007 | Johnson |
| 2007/0233387 A1 | 10/2007 | Johnson |
| 2007/0237096 A1 | 10/2007 | Vengroff et al. |
| 2007/0238491 A1 | 10/2007 | He |
| 2007/0243853 A1 | 10/2007 | Bumiller et al. |
| 2007/0247435 A1 | 10/2007 | Benko et al. |
| 2007/0254676 A1 | 11/2007 | Pedigo et al. |
| 2007/0259674 A1 | 11/2007 | Neef et al. |
| 2007/0260751 A1 | 11/2007 | Meesseman |
| 2007/0266116 A1 | 11/2007 | Rensin et al. |
| 2007/0270159 A1 | 11/2007 | Lohtia et al. |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0281664 A1 | 12/2007 | Kaneko et al. |
| 2007/0282521 A1 | 12/2007 | Broughton |
| 2007/0282565 A1 | 12/2007 | Bye et al. |
| 2007/0290920 A1 | 12/2007 | Shintai et al. |
| 2007/0296573 A1 | 12/2007 | Schlesier et al. |
| 2007/0299601 A1 | 12/2007 | Zhao et al. |
| 2008/0004789 A1 | 1/2008 | Horvitz et al. |
| 2008/0004791 A1 | 1/2008 | Sera |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0019335 A1 | 1/2008 | Wallace et al. |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0032721 A1 | 2/2008 | MacDonald et al. |
| 2008/0045234 A1 | 2/2008 | Reed |
| 2008/0046176 A1 | 2/2008 | Jurgens |
| 2008/0052407 A1 | 2/2008 | Baudino et al. |
| 2008/0055154 A1 | 3/2008 | Martucci et al. |
| 2008/0065311 A1 | 3/2008 | Bauchot et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0086455 A1 | 4/2008 | Meisels et al. |
| 2008/0088486 A1 | 4/2008 | Rozum et al. |
| 2008/0091347 A1 | 4/2008 | Tashiro |
| 2008/0096518 A1 | 4/2008 | Mock et al. |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0119200 A1 | 5/2008 | McConnel |
| 2008/0129528 A1 | 6/2008 | Guthrie |

(56) References Cited

U.S. PATENT DOCUMENTS

| | | | |
|---|---|---|---|
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0160956 A1 | 7/2008 | Jackson et al. |
| 2008/0161034 A1 | 7/2008 | Akiyama |
| 2008/0167078 A1* | 7/2008 | Eibye ............... H04M 1/72522 455/566 |
| 2008/0167083 A1 | 7/2008 | Wyld et al. |
| 2008/0167796 A1 | 7/2008 | Narayanaswami |
| 2008/0167811 A1 | 7/2008 | Geelen |
| 2008/0168347 A1 | 7/2008 | Hallyn |
| 2008/0172173 A1 | 7/2008 | Chang et al. |
| 2008/0172361 A1 | 7/2008 | Wong et al. |
| 2008/0172374 A1 | 7/2008 | Wolosin et al. |
| 2008/0176545 A1 | 7/2008 | Dicke et al. |
| 2008/0177793 A1 | 7/2008 | Epstein et al. |
| 2008/0178116 A1 | 7/2008 | Kim |
| 2008/0186162 A1 | 8/2008 | Rajan et al. |
| 2008/0189033 A1 | 8/2008 | Geelen et al. |
| 2008/0194273 A1 | 8/2008 | Kansal et al. |
| 2008/0200142 A1 | 8/2008 | Abdel-Kader et al. |
| 2008/0207167 A1 | 8/2008 | Bugenhagen |
| 2008/0209344 A1 | 8/2008 | Knapp et al. |
| 2008/0225779 A1 | 9/2008 | Bragiel et al. |
| 2008/0227473 A1 | 9/2008 | Haney |
| 2008/0233919 A1 | 9/2008 | Kenney |
| 2008/0242312 A1 | 10/2008 | Paulson et al. |
| 2008/0248815 A1 | 10/2008 | Busch |
| 2008/0249667 A1 | 10/2008 | Horvitz et al. |
| 2008/0249983 A1 | 10/2008 | Meisels et al. |
| 2008/0268876 A1 | 10/2008 | Gelfand et al. |
| 2008/0271072 A1 | 10/2008 | Rothschild et al. |
| 2008/0280600 A1 | 11/2008 | Zhou |
| 2008/0284642 A1 | 11/2008 | Seacat et al. |
| 2008/0287124 A1 | 11/2008 | Karabinis |
| 2008/0288166 A1 | 11/2008 | Onishi |
| 2008/0293397 A1 | 11/2008 | Gajdos et al. |
| 2008/0301144 A1 | 12/2008 | Boss et al. |
| 2008/0310850 A1 | 12/2008 | Pederson et al. |
| 2008/0318550 A1 | 12/2008 | DeAtley |
| 2008/0319644 A1 | 12/2008 | Zehler |
| 2008/0319652 A1 | 12/2008 | Moshfeghi |
| 2009/0003659 A1 | 1/2009 | Forstall et al. |
| 2009/0005005 A1 | 1/2009 | Forstall et al. |
| 2009/0005018 A1 | 1/2009 | Forstall et al. |
| 2009/0005021 A1 | 1/2009 | Forstall et al. |
| 2009/0005068 A1 | 1/2009 | Forstall et al. |
| 2009/0005070 A1 | 1/2009 | Forstall et al. |
| 2009/0005071 A1 | 1/2009 | Forstall et al. |
| 2009/0005072 A1 | 1/2009 | Forstall et al. |
| 2009/0005076 A1 | 1/2009 | Forstall et al. |
| 2009/0005080 A1 | 1/2009 | Forstall et al. |
| 2009/0005082 A1 | 1/2009 | Forstall et al. |
| 2009/0005964 A1 | 1/2009 | Forstall et al. |
| 2009/0005965 A1 | 1/2009 | Forstall et al. |
| 2009/0005975 A1 | 1/2009 | Forstall et al. |
| 2009/0005978 A1 | 1/2009 | Forstall et al. |
| 2009/0005981 A1 | 1/2009 | Forstall et al. |
| 2009/0006336 A1 | 1/2009 | Forstall et al. |
| 2009/0018769 A1 | 1/2009 | Poliak |
| 2009/0030605 A1 | 1/2009 | Breed |
| 2009/0031006 A1 | 1/2009 | Johnson |
| 2009/0033540 A1 | 2/2009 | Breed et al. |
| 2009/0042585 A1 | 2/2009 | Matsuda |
| 2009/0089706 A1 | 4/2009 | Furches et al. |
| 2009/0098857 A1 | 4/2009 | DeAtley |
| 2009/0177385 A1 | 7/2009 | Matas et al. |
| 2009/0182492 A1 | 7/2009 | Alten |
| 2009/0197612 A1 | 8/2009 | Kiiskinen |
| 2009/0228961 A1 | 9/2009 | Wald et al. |
| 2009/0234743 A1 | 9/2009 | Wald et al. |
| 2009/0259573 A1 | 10/2009 | Cheng et al. |
| 2009/0271271 A1 | 10/2009 | Johnson |
| 2009/0281724 A1 | 11/2009 | Blumenberg et al. |
| 2009/0286549 A1 | 11/2009 | Canon et al. |
| 2010/0082820 A1 | 4/2010 | Furukawa |
| 2010/0106397 A1 | 4/2010 | Van Essen |
| 2010/0128935 A1 | 5/2010 | Filley et al. |
| 2010/0131584 A1 | 5/2010 | Johnson |
| 2010/0173647 A1 | 7/2010 | Sheynblat |
| 2010/0207782 A1 | 8/2010 | Johnson |
| 2010/0285817 A1 | 11/2010 | Zhao et al. |
| 2011/0051658 A1 | 3/2011 | Jin et al. |
| 2011/0159887 A1 | 6/2011 | Lohtia et al. |
| 2011/0276591 A1 | 11/2011 | Bliss et al. |
| 2012/0270567 A1 | 10/2012 | Johnson |
| 2013/0225203 A1 | 8/2013 | Johnson |
| 2014/0066100 A1 | 3/2014 | Johnson |
| 2018/0172449 A1 | 6/2018 | Forstall et al. |

FOREIGN PATENT DOCUMENTS

| | | |
|---|---|---|
| CA | 2287596 | 4/2000 |
| CA | 2432239 | 12/2004 |
| CN | 1 412 573 | 4/2003 |
| DE | 3 621 456 | 1/1988 |
| DE | 4437360 | 4/1996 |
| DE | 19506890 | 8/1996 |
| DE | 19914257 | 1/2000 |
| DE | 10 141 695 | 3/2003 |
| EP | 0 288 068 | 7/1992 |
| EP | 05-071974 | 3/1993 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 785 535 | 7/1997 |
| EP | 0 786 646 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| EP | 1 251 362 | 10/2002 |
| EP | 1 300 652 | 4/2003 |
| EP | 1 406 617 | 3/2004 |
| EP | 1 437 573 | 7/2004 |
| EP | 1 457 928 | 9/2004 |
| EP | 1 465 041 | 10/2004 |
| EP | 1 469 287 | 10/2004 |
| EP | 1 496 338 | 1/2005 |
| EP | 1 659 817 | 5/2006 |
| EP | 1 672 474 | 6/2006 |
| EP | 1 770 956 | 4/2007 |
| EP | 1 790 947 | 5/2007 |
| EP | 1 860 904 | 11/2007 |
| EP | 1 944 701 | 7/2008 |
| EP | 1 933 249 | 8/2008 |
| EP | 1 975 567 | 10/2008 |
| FR | 2730083 | 8/1996 |
| FR | 2754093 | 4/1998 |
| FR | 2772911 | 6/1999 |
| FR | 2810183 | 12/2001 |
| GB | 2 278 196 | 11/1994 |
| GB | 2 322 248 | 8/1998 |
| GB | 2 359 888 | 9/2001 |
| GB | 2 407 230 | 4/2005 |
| JP | 62142215 | 6/1987 |
| JP | 5-191504 | 7/1993 |
| JP | 08-069436 | 3/1996 |
| JP | 8510578 | 11/1996 |
| JP | 09-054895 | 2/1997 |
| JP | 9-062993 | 3/1997 |
| JP | 9-80144 | 3/1997 |
| JP | 09-098474 | 4/1997 |
| JP | 9-113288 | 5/1997 |
| JP | 09-153125 | 6/1997 |
| JP | 09-200850 | 7/1997 |

(56) References Cited

FOREIGN PATENT DOCUMENTS

| | | |
|---|---|---|
| JP | 9-210710 | 8/1997 |
| JP | 9-319300 | 12/1997 |
| JP | 10-021259 | 1/1998 |
| JP | 10-030933 | 2/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2001-313972 | 11/2001 |
| JP | 2002-174524 | 6/2002 |
| JP | 2002-310680 | 10/2002 |
| JP | 2002-329296 | 11/2002 |
| JP | 2003-228532 | 8/2003 |
| JP | 2004-045054 | 2/2004 |
| JP | 2004-219146 | 8/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2005/277764 | 10/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-221433 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2007-538265 | 12/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 1993/020546 | 10/1993 |
| WO | WO 1994/08250 | 4/1994 |
| WO | WO 1997/07467 | 2/1997 |
| WO | WO 1997/24577 | 7/1997 |
| WO | WO 1997/41654 | 11/1997 |
| WO | WO 1998/03951 | 1/1998 |
| WO | WO 1998/07112 | 2/1998 |
| WO | WO 1998/054682 | 12/1998 |
| WO | WO 1999/16036 | 4/1999 |
| WO | WO 1999/44183 | 9/1999 |
| WO | WO 1999/61934 | 12/1999 |
| WO | WO 2001/31966 | 5/2001 |
| WO | WO 2001/37597 | 5/2001 |
| WO | WO 2001/055994 | 8/2001 |
| WO | WO 2002/33533 | 4/2002 |
| WO | WO 2002/054813 | 7/2002 |
| WO | WO 2003/023593 | 3/2003 |
| WO | WO 2003/096055 | 11/2003 |
| WO | WO 2004/008792 | 1/2004 |
| WO | WO 2004/16032 | 2/2004 |
| WO | WO 2004/021730 | 3/2004 |
| WO | WO 2004/34194 | 4/2004 |
| WO | WO 2004/061576 | 7/2004 |
| WO | WO 2004/076977 | 9/2004 |
| WO | WO 2005/06258 | 1/2005 |
| WO | WO 2005/84052 | 9/2005 |
| WO | WO 2006/065856 | 6/2006 |
| WO | WO 2006/113125 | 10/2006 |
| WO | WO 2007/27065 | 3/2007 |
| WO | WO 2007/52285 | 5/2007 |
| WO | WO 2008/051929 | 5/2008 |
| WO | WO 2008/085740 | 7/2008 |
| WO | WO 2009/02942 | 12/2008 |
| WO | WO 2009/140031 | 11/2009 |

OTHER PUBLICATIONS

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"Animated Transition," [online] [Retrieved on Oct. 16, 2006]; Retrieved from the Internet URL: http://designinginterfaces.com/Animated_Transition; 2 pages.

"DaimlerCrysler Guide5 Usecases Overview Map," 1 page.

Digital cellular telecommunications system (Phase 2+); Location Services (LCS); Service description, Stage 1 (GSM 02.71) ETSI, Apr. 1999, 22 pages.

"Enabling UMTS / Third Generation Services and Applications," No. 11 Report from the UMTS Forum, Oct. 2000, 72 pages.

"Error: could not find a contact with this e-mail address." Outlookbanter.com. Dec. 2006, 12 pages.

"Estonian operator to launch world's first Network-based location services," Ericsson Press Release, Oct. 11, 1999, 2 pages.

"FM 3-25.26 Map Reading and Land Navigation," Headquarters Department of the Army, Washington, DC [online] [Retrieved on Apr. 9, 2004]; Retrieved from the Internet URL: http://155.217.58.58/cgi-bin/atdl.dll/fm/3-25.26/toc.htm; Jul. 20, 2001, pp. 1-7 and J-1 to J-3.

"Frontiers in Electronic Media," *Interactions*, 1997, 4(4):32-64.

"GPS 12 Personal NavigatorTM Owner's Manual & Reference", Garmin Corporation, 1999, 66 pages.

"International Numbering and SMS—Type of Numbering, TON, Numbering Plan Indicator, NPI," *ActiveXperts SMS and Pager Toolkit 4.1*, [online] [Retrieved on Jan. 5, 2007]; Retrieved from the Internet URL: http://www.activexperts.com/support/activsms/tonnpi/; 2 pages.

"International Roaming Guide—Personal Experience(s) from Customer and Community Member," [online] [Retrieved Jun. 26, 2006]; Retrieved from the Internet URL: http://forums.cingular.com/cng/board/message?board.id=international&message.id=1185; 6 pages.

"LaBarge in joint venture on bus system," Internet: URL: http://www.bizjournals.com/stlouis/stories/1998/08/10/focus2.html?t-printable, Aug. 7, 1998, 1 page.

"New Handsets Strut Their Stuff at Wireless '99," Internet: URL: http://findarticles.com/p/articles/mi_m0BMD/is_1999_Feb_11/ai_n27547656/ downloaded from Internet on Feb. 11, 1999, 3 pages.

"New program for mobile blogging for Pocket PC released: My Blog," [online] [Retrieved on Apr. 5, 2006]; Retrieved from the Internet URL: http://msmobiles.com/news.php/4067.html; 1 page.

"Numbering and Dialing Plan Within the United States," *Alliance for Telecommunications Industry Solutions*, 2005, 17 pages.

"Report on Location Service feature (LCS) 25.923 v1.0.0," TSG-RAN Working Group 2 (Radio layer 2 and Radio layer 3), Berlin, May 25-28, 1999, 45 pages.

"Review Guide—Google Maps for mobile (beta)," Google, 2006, 7 pages.

"Revised CR to 09/31 on work item LCS," ETSI SMG3 Plenary Meeting #6, Nice, France, Dec. 13-15, 1999. 18 pages.

"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

"Travel Time Data Collection Handbook—Chapter 5: ITS Probe Vehicle Techniques," FHWA-PL-98-035 Report, Department of Transport, University of Texas, Mar. 1998; [online] [Retrieved from the Internet at http://www.fhwa.dot.gov/ohim/handbook/chap5.pdf, 70 pages.

"User-centered design of mobile solutions," NAMAHN, 2006, 18 pages.

(56) References Cited

OTHER PUBLICATIONS

"Windows Live Search for Mobile Goes Final, Still Great," [online] [Retrieved on Mar. 11, 2007]; Retrieved from the Internet URL: http://gizmodo.com/gadgets/software/windows-live-search-for-mobile-goes-final-still-great-236002.php; 3 pages.
"Windows Mobile 6 Professional Video Tour," [online] [Retrieved on Mar. 11, 2007]; Retrieved from the Internet URL: http://gizmodo.com/gadgets/cellphones/windows-mobile-6-professional-video-tour-237039.php; 4 pages.
"Windows Mobile," Microsoft, 2007, 2 pages.
Abowd et al., "Context-awareness in wearable and ubiquitous computing," *1st International Symposium on Wearable Computers*, Oct. 13-14, 1997, Cambridge, MA, 9 pages.
Abowd et al., "Cyberguide: A mobile context-aware tour guide," *Wireless Networks*, 1997, 3(5):421-433.
Akerblom, "Tracking Mobile Phones in Urban Areas," Goteborg University Thesis, Sep. 2000, 67 pages.
Anand et al., "A Quantitative Analysis of Power Consumption for Location-Aware Applications on Smart Phones," *IEEE International Symposium on Industrial Electronics*, Jun. 4-7, 2007, pp. 1986-1991.
Authorized officer Cristina Novelli, International Search Report/Written Opinion in PCT/US2009/041298 dated Oct. 1, 2009, 15 pages.
Authorized officer E Pascual Vallés, International Search Report/Written Opinion in Application No. PCT/US2007/088880 dated Jun. 16, 2008, 5 pages.
Authorized officer Matthew Davies, Invitation to Pay Additional Fees and, Where Applicable, Protest Fee, PCT/US2008/050295 mailed Jul. 29, 2008, 10 pages.
Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.
Balliet, "Transportation Information Distribution System," *IBM Technical Disclosure Bulletin*, [online] [Retrieved on Nov. 7, 2008]; Retrieved from the Internet URL: https://www.delphion.com/tdbs/tdb?order=86A+61395; Jun. 1986; 2 pages.
Balsiger et al., "MOGID: Mobile Geo-depended Information on Demand," *Workshop on Position Dependent Information Services (W3C-WAP)*, 2000, 8 pages.
Beard and Palancioglu, "Estimating Positions and Paths of Moving Objects," *IEEE*, 2000, pp. 1-8.
Bederson, "Audio Augmented Reality: A Prototype Automated Tour Guide," *CHI '95 Mosaic of Creativity*, May 7-11, 1995, Chicago, IL, pp. 210-211.
Beeharee and Steed, "Minimising Pedestrian Navigational Ambiguities Through Geoannotation and Temporal Tagging," Human-Computer Interaction, Interaction Platforms and Techniques, Springer, 2007, pp. 748-757.
Beeharee and Steed, "Natural Wayfinding—Exploiting Photos in Pedestrian Navigation Systems," *Mobile HCI*, Sep. 12, 2006, pp. 81-88.
Benefon ESC! GSM+GPS Personal Navigation Phone, benefon.com, Copyright 2001, 4 pages.
Berman and Powell, "The Role of Dead Reckoning and Inertial Sensors in Future General Aviation Navigation," *IEEE*, 1998, pp. 510-517.
Bevly and Parkinson, "Cascaded Kalman Filters for Accurate Estimation of Multiple Biases, Dead-Reckoning Navigation, and Full State Feedback Control of Ground Vehicles," *IEEE Transactions on Control Systems in Technology*, 2007, 15(2):199-208.
Binzhuo and Bin, "Mobile Phone GIS Based on Mobile SVG," *IEEE*, 2005, pp. 889-892.
Bokharouss et al., "A Location-Aware Mobile Call Handling Assistant," *21st International Conference on Advanced Information Networking and Applications Workshops*, 2007, 8 pages.
Bonsignore, "A Comparative Evaluation of the Benefits of Advanced Traveler Information System (ATIS) Operational Tests," MIT Masters Thesis, Feb. 1994, 140 pps.
Boonsrimuang et al., "Mobile Internet Navigation System," *IEEE*, 2002, pp. 325-328.
Borsodi, "Super Resolution of Discrete Arrivals in a Cellular Geolocation System," University of Calgary Thesis, Apr. 2000, 164 pages.
Brown, "The stick-e document: a framework for creating context-aware applications," *Electronic Publishing*, 1995, 8:259-272.
Brown, "Triggering Information by Context," *Personal Technologies*, 1998, 2:18-27.
Budka et al., "A Bayesian Method to Improve Mobile Geolocation Accuracy," IEEE 56th Vehicular Technology Conference Proceedings, Sep. 24-28, 2002, Vancouver, CA, 2:1021-1025.
Burnett, "Usable Vehicle Navigation Systems: Are We There Yet?" *Vehicle Electronic Systems 2000*, Jun. 29-30, 2000, 3.1.1-3.1.12.
Camp and DeHayes, Jr., "A computer-based method for predicting transit time parameters using grid systems," *Decision Sciences*, 1974, 5:339-346.
Carew, "Phones that tell you where to drive, meet, eat," [online] [Retrieved May 26, 2007]; Retrieved from the Internet URL http://news.yahoo.com/s/nm/20070525/wr_nm/column_pluggedin_dc_2&printer=1;_ylt=Ahqaftn7xm1S2r0FZFeu9G4ht.cA; 2 pages.
Challe, "CARMINAT—An Integrated information and guidance system," *Vehicle Navigation and Information Systems Conference*, Oct. 20-23, 1991, Renault—Direction de la Recherche, Rueil-Malmaison, France.
Change Request for "U.S. specific Emergency Services requirements included as an informative annex," Nov. 29, 1999, 2 pages.
Charny, "AT&T puts 411 to the text," [online] [Retrieved Mar. 4, 2009]; Retrieved from the Internet URL http://news.cnet.com/ATT-puts-411-to-the-text/2100-1039_3-1000669.html; May 8, 2003; 2 pages.
Cheverst et al., "Architectural Ideas for the Support of Adaptive Context-Aware Applications," *Proceedings of Workshop on Infrastructure for Smart Devices—How to Make Ubiquity an Actuality, HUC'00*, Bristol, Sep. 2000, 3 pages.
Cheverst et al., "Design of an Object Model for a Context Sensitive Tourist Guide," *Computers and Graphics*, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The Guide Project," 2000, pp. 20-31.
Cheverst et al., "Exploiting Context to Support Social Awareness and Social Navigation," *SIGGROUP Bulleting* Dec. 2000, 21(3):43-48.
Cheverst et al., "Services to Support Consistency in Mobile Collaborative Applications," *Proc. 3rd International Workshop on Services in Distributed Networked Environments*, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," *Workshop on Handheld CSCW*, 1998, 6 pages.
Cheverst et al., "The Role of Connectivity in Supporting Context-Sensitive Applications," *HUC'99, LNCS 1707*, 1999, pp. 193-209.
Cheverst et al., "The Support of Mobile-Awareness in Collaborative Groupware," *Personal Technologies*, 1999, 3:33-42.
Cho et al., "A Traveler Information Service Structure in Hybrid T-DMB and Cellular Communication Network," *IEEE*, 2006, pp. 747-750.
Christie et al., "Development and Deployment of GPS wireless devices for E911 and Location based services," Position, location and Navigation Symposium, Palm Springs, CA, Apr. 15-18, 2002, pp. 60-65w.
Chua et al., "Intelligent Portal for Event-triggered SMS Alerts," *2nd International Conference on Mobile Technology, Applications and Systems*, 2005, 7 pages.
Civilis et al., "Efficient Tracking of Moving Objects with Precision Guarantees," *Proc. First Annual International Conference on Mobile and Ubiquitous Systems: Networking and Services (MobiQuitous '04)*, 2004, 10 pages.
Clarke et al., "Development of Human Factors Guidelines for Advanced Traveler Information Systems (ATIS) and Commercial Vehicle Operations (CVO): Comparable Systems Analysis," U.S.

(56) References Cited

OTHER PUBLICATIONS

Department of Transportation Federal Highway Administration, Publication No. FHWA-RD-95-197, Dec. 1996, 212 pages.
Costa et al., "Experiments with Reflective Middleware," *Proceedings of the ECOOP '98 Workshop on Reflective Object-Oriented Programming and Systems, ECOOP '98 Workshop Reader*, 1998, 13 pages.
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJ1b954T_DQn6gB; 1 page.
Davies et al., "'Caches in the Air': Disseminating Tourist Information in the Guide System," *Second IEEE Workshop on Mobile Computer Systems and Applications*, Feb. 25-26, 1999, 9 pages.
Davies et al., "L2imbo: A distributed systems plastform for mobile computing," *Mobile Networks and Applications*, 1998, 3:143-156.
Dey et al., "CyberDesk: a framework for providing self-integrating context-aware services," *Knowledge-Based Systems*, 1998, 11:3-13.
Dey, "Context-Aware Computing: The CyberDesk Project," [online] Retrieved from the Internet: URL: http://www.cc.gatech.edu/fce/cyberdesk/pubs/AAAI98/AAAI98.html;*AAAI '98 Spring Symposium*, Stanford University, Mar. 23-25, 1998, downloaded from the Internet on Aug. 6, 2010, 8 pages.
Dibdin, "Where are mobile location based services?" *CM316 Multimedia Systems Paper*, Dec. 14, 2001, 8 pages.
Dix et al., "Exploiting Space and Location as a Design Framework for Interactive Mobile Systems," *ACM Transactions on Computer-Human Interaction (TOCHI)—Special issue on human-computer interaction with mobile systems*, 2000, 7(3):285-321.
Dommety and Jain, "Potential Networking Applications of Global Positioning Systems (GPS)," [online] [Retrieved on Nov. 18, 2008]; Retrieved from the Internet URL: http://arxiv.org/ftp/cs/papers/9809/9809079.pdf; OSU Technical Report TR-24, Apr. 1996, 41 pages.
Drane and Rizos, "Role of Positioning Systems in ITS," *Positioning Systems in Intelligent Transportation Systems*, Dec. 1997, pp. 312, 346-349.
Drane et al., "Positioning GSM Telephones," *IEEE Communications Magazine*, Apr. 1998, pp. 46-59.
Drane et al., "The Accurate Location of Mobile Telephones," *Third Annual World Congress on Intelligent Transport Systems*, Orlando, Florida, Oct. 1996, 8 pages.
Dunn and Toohey, "Wireless Emergency Call System," *IBM Technical Disclosure Bulletin*, Sep. 1994; 1 page.
Ebine, "Dual frequency resonant base station antennas for PDC systems in Japan," *IEEE*, 1999, pp. 564-567.
Efstratiou and Cheverst, "Reflection: A Solution for Highly Adaptive Mobile Systems," *2000 Workshop on Reflective Middleware*, 2000, 2 pages.
Efstratiou et al., "Architectural Requirements for the Effective Support of Adaptive Mobile Applications," 2000, 12 pages.
Evans et al., "In-Vehicle Man-Machine Interaction. The Socrates Approach," *Vehicle Navigation & Information System Conference Proceedings*, Aug. 31, 1994-Sep. 2, 1994, pp. 473-477.
European Search Report in EP 12 15 4024 dated Apr. 10, 2012, 6 pages.
European Search Report in EP 12 15 4025 dated Apr. 12, 2012, 7 pages.
European Search Report in EP 12 15 4026 dated Apr. 10, 2012, 5 pages.
European Search Report in EP 12 15 4027 dated Apr. 10, 2012, 7 pages.
European Search Report in EP 09 00 0094 dated Apr. 28, 2009, 7 pages.
International Preliminary Report on Patentability in PCT/US2009/055065 dated Mar. 31, 2011, 8 pages.
International Preliminary Report on Patentability in PCT/US2010/033003 dated Nov. 10, 2011, 6 pages.
Partial European Search Report in EP 09 17 0460 dated Dec. 28, 2009, 6 pages.
Examination Report in JP 2011-509530 dated Apr. 17, 2013, 9 pages.
Feddema et al., "Cooperative Sentry Vehicles and Differential GPS Leapfrog," 2000, *United States Department of Energy*, pp. 1-12.
Fischer et al., "System Performance Evaluation of Mobile Positioning Methods," *IEEE*, Aug. 2002, pp. 1962-1966.
Flinn and Satyanarayanan, "PowerScope: A Tool for Profiling the Energy Usage of Mobile Applications," *Proc. WMCSA '99 Second IEEE Workshop on Mobile Computing Systems and Applications*, Feb. 25-26, 1999, 9 pages.
French and Driscoll, "Location Technologies for ITS Emergency Notification and E911," *Proc. 1996 National Technical Meeting of The Institute of Navigation*, Jan. 22-24, 1996, pp. 355-359.
Freundschuh, "Does 'Anybody' Really Want (or Need) Vehicle Navigation Aids?" *First Vehicle Navigation and Information System Conference*, Sep. 11-13, 1989, Toronto, Canada, 5 pages.
Friday et al., "Developing Adaptive Applications: The MOST Experience," *J. Integrated Computer-Aided Engineering*, 1999, pp. 143-157.
Gould, "The Provision of Usable Navigation Assistance: Considering Individual Cognitive Ability," *First Vehicle Navigation and Information System Conference*, Sep. 11-13, 1989, Toronto, Canada, 7 pages.
Green et al., "Suggested Human Factors Design Guidelines for Driver Information Systems," *Technical Report UMTRI-93-21*, Nov. 1993, 119 pages.
Gunnarsson et al., "Location Trial System for Mobile Phones," *IEEE*, 1998, pp. 2211-2216.
Guo et al., "An Intelligent Query System Based on Chinese Short Message Service for Restaurant Recommendation," *Sixth International Conference on the Management of Mobile Business (ICMB 2007)*, 2007, 1 page.
Hameed and Shabnam, "An Intelligent Agent-Based Medication and Emergency System," *IEEE*, 2006, pp. 3326-3330.
Helal et al., "Drishti: An Integrated Navigation System for Visually Impaired and Disabled," *Fifth International Symposium on Wearable Computers (ISWC'01)*, 2001, pp. 149-156.
Hodes and Katz, "Composable ad hoc location-based services for heterogeneous mobile clients," *Wireless Networks*, 1999, 5:411-427.
Hohman et al., "GPS Roadside Integrated Precision Positioning System," *Position Location and Navigation Symposium*, 2000, pp. 221-230.
Hoogenraad, "Location Dependent Services," *3rd AGILE Conference on Geographic Information Science*, Helsinki/Espoo, Finland, May 25-27, 2000, pp. 74-77.
Jirawimut et al., "A Method for Dead Reckoning Parameter Correction in Pedestrian Navigation System," *IEEE Transactions on Instrumentation and Measurement*, 2003, 52(1):209-215.
Jose and Davies, "Scalabe and Flexible Location-Based Services for Ubiquitous Information Access," *HUC'99, LNCS 1707*, 1999, pp. 52-66.
Ju et al., "RFID Data Collection and Integration Based on Mobile Agent," *IEEE*, 2006, 4 pages.
Kbar and Mansoor, "Mobile Station Location based on Hybrid of Signal Strength and Time of Arrival," *Proc. International Conference on Mobile Business (ICMB'05)*, 2005, 7 pages.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Klinec and Nolz, "Nexus-Positioning and Communication Environment for Spatially Aware Applications," *IAPRS*, Amsterdam, 2000, 7 pages.
Koide and Kato, "3-D Human Navigation System with Consideration of Neighboring Space Information," *2006 IEEE International Conference on Systems, Man and Cybernetics*, Oct. 8-11, 2006, Taipei, Taiwan, pp. 1693-1698.
Kovacs et al., "Adaptive Mobile Access to Context-aware Services," *Proc. ASAMA '99 Proc. First International Symposium on Agent Systems and Applications Third International Symposium on Mobile Agents*, IEEE Computer Society Washington, DC, 1999, 12 pages.

(56) References Cited

OTHER PUBLICATIONS

Kreller et al., "A Mobile-Aware City Guide Application," *ACTS Mobile Communication Summit*, 1998, Rhodes, Greece, 7 pages.
Kreller et al., "UMTS: A Middleware Architecture and Mobile API/Approach," *IEEE Personal Communications*, Apr. 1998, pp. 32-38.
Kugler and Lechner, "Combined Use of GPS and LORAN-C in Integrated Navigation Systems," *Fifth International Conference on Satellite Systems for Mobile Communications and Navigation*, London, UK, May 13-15, 1996, pp. 199-207.
Kyriazakos et al., "Optimization of the Handover Algorithm based on the Position of the Mobile Terminals," Communications and Vehicular Technology, Oct. 2000, pp. 155-159.
Leonhardt and Magee, "Multi-Sensor Location Tracking," *MOBICOM 98*, Dallas, TX, pp. 203-214.
Leonhardt and Magee, "Towards a general location service for mobile environments," *Proc. Third International Workshop on Services in Distributed and Networked Environments*, Jun. 3-4, 1996, 8 pages.
Lloyd and Tianlin, "Cellular phone base stations installation violate the Electromagnetic Compatibility regulations," *2004 4th International Conference on Microwave and Millimeter Wave Technology Proceedings*, 2004, pp. 920-922.
Long et al., "Rapid Prototyping of Mobile Context-Aware Applications: The Cyberguide Case Study," *MobiCom '96*, 1996, 11 pages.
Lusky et al., "Mapping the Present," *ColoradoBiz*, Nov. 1999, 26(11):16-17.
Maaß, "Location-Aware Mobile Applications based on Directory Services," *MOBICOM 97*, 1997, Budapest, Hungary, pp. 23-33.
Mahmassani et al., "Providing Advanced and Real-Time Travel/Traffic Information to Tourists," *Center for Transportation Research, Bureau of Engineering Research, The University of Texas at Austin*, Oct. 1998, 15 pages.
Manabe et al., "On the M-CubITS Pedestrian Navigation System," *Proc. IEEE Intelligent Transportation Systems Conference*, Toronto, Canada, Sep. 17-20, 2006, pp. 793-798.
Mark, "A Conceptual Model for Vehicle Navigation Systems," *First Vehicle Navigation and Information System Conference*, Sep. 11-13, 1989, Toronto, Canada 11 pages.
Maxwell et al., "Alfred: The Robot Waiter Who Remembers You," *AAAI Technical Report WS-99-15*, 1999, 12 pages.
McCarthy and Meidel, "ACTIVEMAP: A Visualization Tool for Location Awareness to Support Informal Interactions," *HUC '99, LNCS 1707*, 1999, pp. 158-170.
Meier and Cahill, "Location-Aware Event-Based Middleware: A Paradigm for Collaborative Mobile Applications?" *8th CaberNet Radicals Workshop*, 2003, 5 pages.
Microsoft Outlook 2003 User's Guide, http://opan.admin.ufl.edu/user_guides/outlook2003.htm. Aug. 2004, 17 pages.
Miller et al., "Integrating Hierarchical Navigation and Querying: A User Customizable Solution," *ACM—Multimedia Workshop on Effective Abstractions in Multimedia Layout, Presentation, and Interaction*, San Francisco, CA, Nov. 1995, 8 pages.
Miller et al., "Synchronization of Mobile XML Databases by Utilizing Deferred Views," *IEEE*, 2004, pp. 186-191.
Mio Technology "User's Manual MioMap 2.0," Mio DigiWalker, 2005, 59 pages.
Mio Technology: "27 Countries in your pocket," [online] [Retrieved on Jul. 9, 2008]; Retrieved from the Internet URL: http://www.mio-tech.be/en/printview/press-releases-2005-09-29.htm>; 1 page.
Mio Technology: "Mio 269+ User's Manual," [online] [Retrieved on Jul. 9, 2008]; Retrieved from the Internet URL: http://www.mio-tech.be/Manuals/269+/Device-Manual/268-plus-269-plus-Device-Manual-EN.pdf> Mio DigiWalker, Aug. 2005, 44 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Nardi et al., "Integrating Communication and Information Through Contact Map," *Communications of the ACM*, 2002, 45(4):89-95.
Ni and Deakin, "On-Board Advanced Traveler Information Systems," Dec. 1, 2002, 10 pages.
Noonan and Shearer, "Intelligent Transportation Systems Field Operational Test Cross-Cutting Study Advance Traveler Information systems," *Intelligent Transportation Systems Field Operational Test Cross-Cutting Study*, Sep. 1998, 26 pages.
Northard, "Docking Station Communication Link," *IBM Technical Disclosure Bulletin*, 1994, 4 pages.
O'Grady et al., "A Tourist-Centric Mechanism for Interacting with the Environment," *Proceedings of the First International Workshop on Managing Interactions in Smart Environments (MANSE '99)*, Dublin, Ireland, Dec. 1999, pp. 56-67.
Oh et al., "Spatial Applications Using 4S Technology for Mobile Environment," *IEEE*, 2002, 3 pages.
Paksoy et al., "The Global Position System—Navigation Tool of the Future," *J. Electrical & Electronics*, 2002, 2(1):467-476.
Parikh, "Tele Locate," *IBM Technical Disclosure Bulletin*, [online] [Retrieved on Nov. 7, 2008]; Retrieved from the Internet URL: https://www.delphion.com/tdbs/tdb?order=92A+62775; 1992, 1 page.
Pascoe et al., "Developing Personal Technology for the Field," *Personal Technologies*, 1998, 2:28-36.
Pfoser et al., "Dynamic Travel Time Maps—Enabling Efficient Navigation," *Proc. 18th International Conference on Scientific and Statistical Database Management (SSDBM'06)*, 2006, 10 pages.
Popescu-Zeletin et al., "Applying Location-Aware Computing for Electronic Commerce: Mobile Guide," *Proc. 5th Conference on Computer Communications*, AFRICOM-CCDC'98,Oct. 20-22, 1998, 14 pages.
Portfolio 2007; [online] [Retrieved on Jun. 14, 2007]; Retrieved from the Internet URL: http://eric.wahlforss.com/folio; 3 pages.
Pungel, "Traffic control—beat the jam electronically," *Funkschau*, 1988, 18:43-45 (w/English translation).
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto et al., "Augment-able Reality: Situated Communication through Physical and Digital Spaces," *Second International Symposium on Wearable Computers (ISWC'98)*, 1998, pp. 1-8.
Rillings and Betsold, "Advanced driver information systems," *Vehicular Technology*, IEEE Vehicular Technology Society, 1991, 40:31-40.
Rogers et al., "Adaptive User Interfaces for Automotive Environments," *Proc. IEEE Intelligent Vehicles Symposium 2000*, Oct. 3-5, 2000, Dearborn, MI, pp. 662-667.
Rozier et al. "Hear&There: An Augmented Reality System of Linked Audio," *Proceedings of the International Conference on Auditory Display*, Atlanta, GA, Apr. 2000, pp. 1-5.
Samadani et al., "PathMarker: systems for capturing trips," *2004 IEEE International Conference on Multimedia and Expo (ICME)*, Jun. 27-30, 2004, 3:2123-2126.
Schreiner, "Where We at? Mobile Phones Bring GPS to the Masses," *IEEE Computer Society*, May/Jun. 2007, pp. 6-11.
Serafin et al., "Functions and Features of Future Driver Information Systems," *Technical Report UMTRI-91-16*, May 1991, 104 pages.
Shekhar and Liu, "Genesis and Advanced Traveler Information Systems (ATIS): Killer Applications for Mobile Computing?" *NSF Mobidata Workshop on Mobile and Wireless Information Systems*, Nov. 1994, 20 pages.
Shibata et al., "Development and Integration of Generic Components for a Teachable Vision-Based Mobile Robot," *IEEE/ASME Transactions on Mechatronics*, 1996, 1(3):230-236.
Spohrer, "New Paradigms for Using Computers (Abstract)," 1997; [online]; Retrieved from the Internet URL: http://www.almaden.ibm.com/almaden/npuc97/1997/spohrer.htm; 1 page.
Sung et al., "Towards Reliable Peer-to-Peer Data Sharing over Mobile Ad hoc Networks," *IEEE*, 2005, 5 pages.

(56) References Cited

OTHER PUBLICATIONS

Tarumi et al., "Public Applications of SpaceTag and Their Impacts," *Digital Cities, LNCS 1765*, 2000, pp. 350-363.
Tebbutt, "Dial your way out of the woods," *The Australian*, Feb. 2000, 1 page.
Tijerina et al., "Driver Workload Assessment of Route Guidance System Destination Entry While Driving: A Test Track Study," *Proceedings of the 5th ITS World Congress*, Oct. 12-16, 1998, Seoul, Korea, 9 pages.
Tso et al., "Always on, Always Connected Mobile Computing," Mobile Communications Operation—Mobile Handheld Products Group, 1996, pp. 918-924.
Tsuzawa and Okamoto, "Advanced Mobile Traffic Information and Communication System," *First Vehicle Navigation and Information Systems Conference*, Sep. 11-13, 1989, Toronto, Canada, Abstract only.
Wang and Huang, "An Unified Vehicle Supervising and Traffic Information System," *IEEE*, 1996, pp. 968-972.
Wang and Lin, "Location Aware Information Agent over WAP," *Tamkang Journal of Science and Engineering*, 2000, 3(2):107-115.
Weinberg, "Using the ADXL202 in Pedometer and Personal Navigation Applications," AN-602, Analog Devices, Jul. 2002, 8 pages.
Weiß et al., "Zone Services—An Approach for Location-based Data Collection," *Proceedings of the 8th IEEE International Conference on E-Commerce Technology and the 3rd IEEE International Conference on Enterprise Computing, E-Commerce and E-Services (CEC/EEE'06)*, 2006, 8 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pps.
Wong, "GPS: making roads safer and solving traffic tangles," *Asia Engineer*, 1995, 23(9):31-32.
Wu et al., "A Multimedia System for Route Sharing and Video-Based Navigation," *IEEE*, 2006, pp. 73-76.
Yamamoto et al., "Position Location Technologies Using Signal Strength in Cellular Systems," *IEEE 53rd Vehicular Technology Conference*, May 6-9, 2001, Rhodes, Greece, 53:2570-2574.
Yang and Marsland, "Global Snapshots for Distributed Debugging," *IEEE*, 1992, pp. 436-440.
Yanyan et al., "The Model of Optimum Route Selection in Vehicle Automatic Navigation System Based on Unblocked Reliability Analyses," *IEEE*, 2003, pp. 975-978.
Ygnace et al., "Travel Time Estimation on the San Francisco Bay Area Network Using Cellular Phones as Probes," Working Paper, Institute of Transportation Studies, University of California, Berkeley, 2000, 58 pages.
Yim et al., "Travinfo Field Operational Test: Work Plan for the Target, Network, and Value Added Reseller (VAR) Customer Studies," *Working Papers, California Partners for Advanced Transit and Highways (PATH), Institute of Transportation Studies, UC Berkeley*, Apr. 1, 1997, 49 pages.
Yogesh C. Rathod, Third Party Submission in U.S. Appl. No. 12/233,358, filed Mar. 30, 2010, 12 pages.
Yokote, "The Apertos Reflective Operating System: The Concept and Its Implementation," *OOPSLA'92*, pp. 414-434.
Zhao, "Mobile Phone Location Determination and Its Impact on Intelligent Transportation Systems," *IEEE Transactions on Intelligent Transportation Systems*, Mar. 2000, 1(1):55-64.

\* cited by examiner

LOCATION-AWARE MOBILE DEVICE

RELATED APPLICATIONS

This application is a continuation (and claims the benefit of priority under 35 USC 120) of U.S. application Ser. No. 15/435,473, filed Feb. 17, 2017, now allowed, which is a continuation of U.S. application Ser. No. 15/142,343, filed Apr. 29, 2016, now U.S. Pat. No. 9,578,621, issued Feb. 21, 2017, which is a continuation of U.S. application Ser. No. 14/745,638, filed Jun. 22, 2015, now U.S. Pat. No. 9,414,198, issued Aug. 9, 2016, which is a continuation of U.S. application Ser. No. 12/163,858, filed Jun. 27, 2008, now U.S. Pat. No. 9,066,199, issued Jun. 23, 2015, which claims the benefit of priority from U.S. Patent Application No. 60/946,774, filed Jun. 28, 2007. All of these applications are incorporated by reference herein in their entirety.

TECHNICAL FIELD

The subject matter of this patent application is generally related to mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, etc. Modern mobile devices can include two or more of these applications. Due to the size limitation of a typical mobile device, such mobile devices may need to rely on a network or other remote services to support these multiple applications. For example, a map service may provide maps to a mobile device over a network, which can be used with one or more applications running on the mobile device. The introduction of a positioning system integrated with, or coupled to, the mobile device provides additional opportunities for providing location-based services.

SUMMARY

One or more location-based clients can be activated on a mobile device for providing location-based services. The location-based clients can be provided with information (e.g., presets, defaults) related to the current location and/or mode of the mobile device. The information can be obtained from one or more network resources. In some implementations, a number of location-based clients can run concurrently on the mobile device and share information.

In some implementations, a method includes: activating a first location-based client on a mobile device; determining a location of the mobile device; determining a mode associated with the device; transmitting the location and mode to a network resource; receiving information related to the location and mode from the network resource; and providing the information to the first location-based client.

In some implementations, a method includes: receiving a location of a mobile device; receiving a mode associated with the mobile device; identifying information related to the location and the mode; and transmitting the information to the mobile device.

Other implementations are disclosed which are directed to systems, methods and computer-readable mediums.

DETAILED DESCRIPTION

Figure 1:
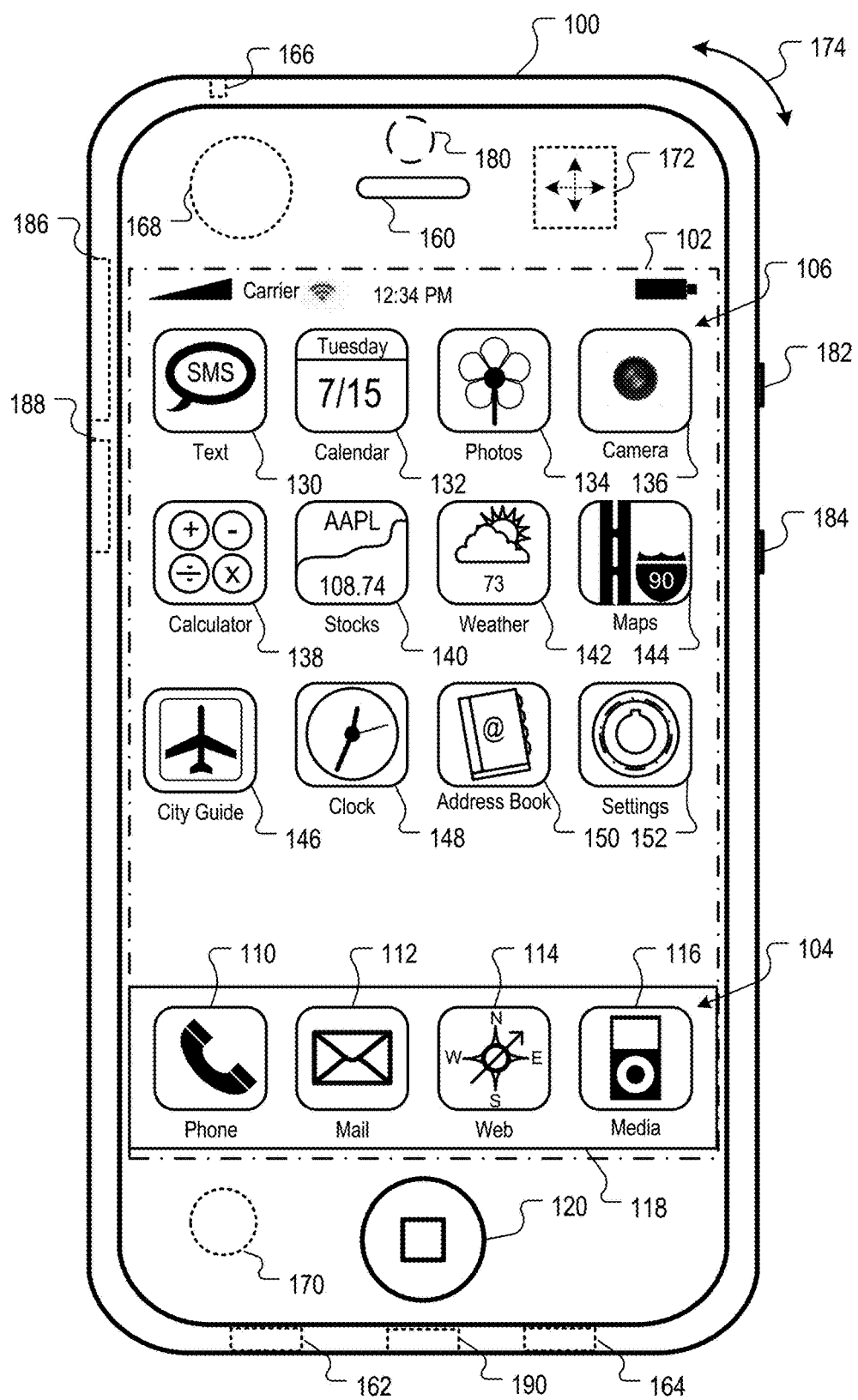
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a city guide object 146, a clock object 148, an address book object 150, and a settings object 152. Touching the SMS display object 130 can, for example, invoke an SMS messaging environment and supporting functionality; likewise, each selection of a display object 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

Network Operating Environment

Figure 2:
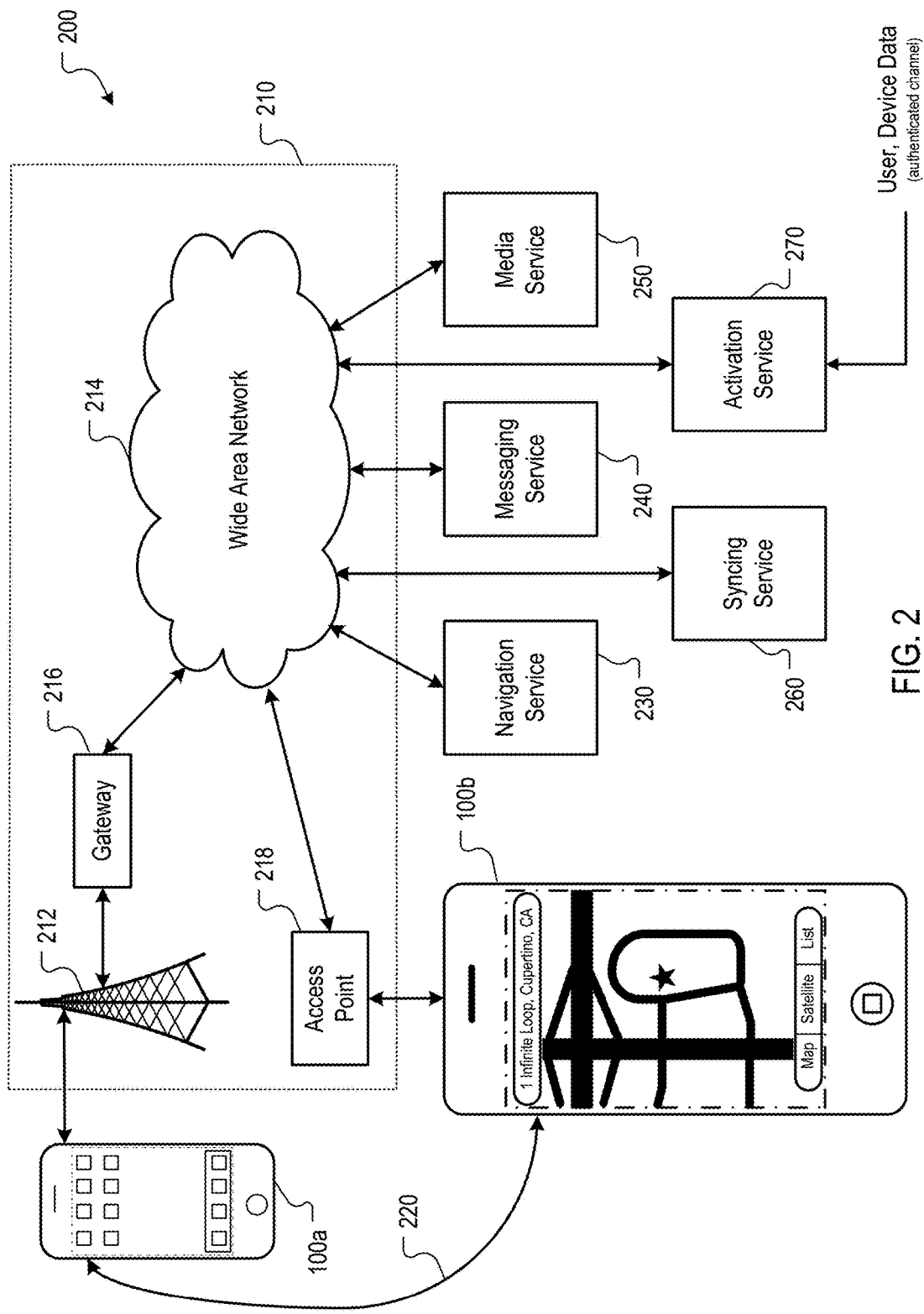
FIG. 2 is a block diagram of an example network operating environment for the mobile device of FIG. 1.

FIG. 2 is a block diagram of an example network operating environment 200 for the mobile device 100 of FIG. 1.

The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 260, 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. A syncing service 260 can, for example, perform syncing services (e.g., sync files). An activation service 270 can, for example, perform an activation process 500 for activating the mobile device 100, as described in reference to FIG. 5. Other services can also be provided, including a software update service that automatically determines whether software updates exist for software on the mobile device 100, then downloads the software updates to the mobile device 100 where it can be manually or automatically unpacked and/or installed.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Example Mobile Device Architecture

Figure 3:
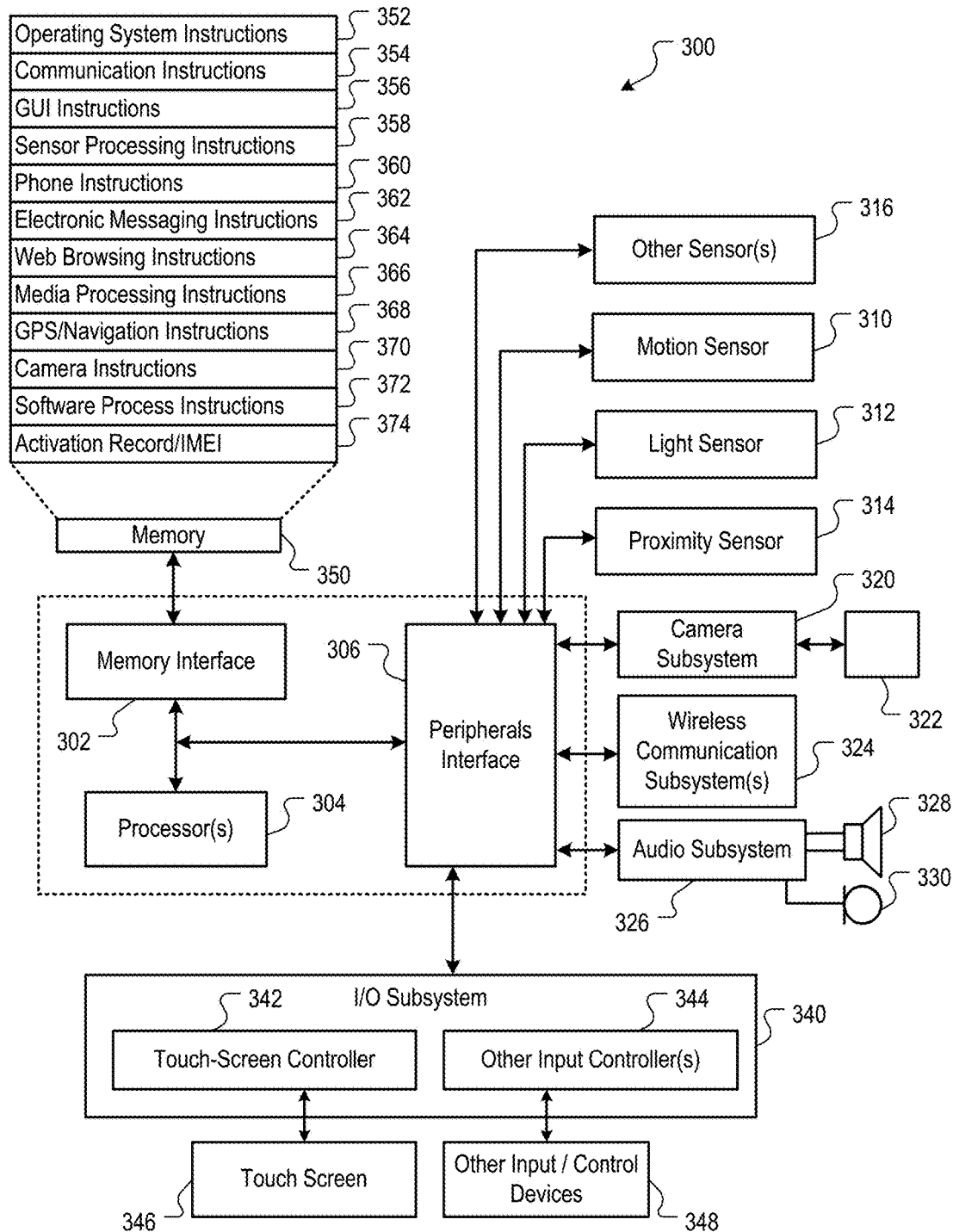
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keypad or keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate processes and functions, as described in reference to FIGS. 4-6. As described below, an activation record and IMEI or similar hardware identifier 374 can also be stored in memory 350.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Software Stack and Security Process

Figure 4A:
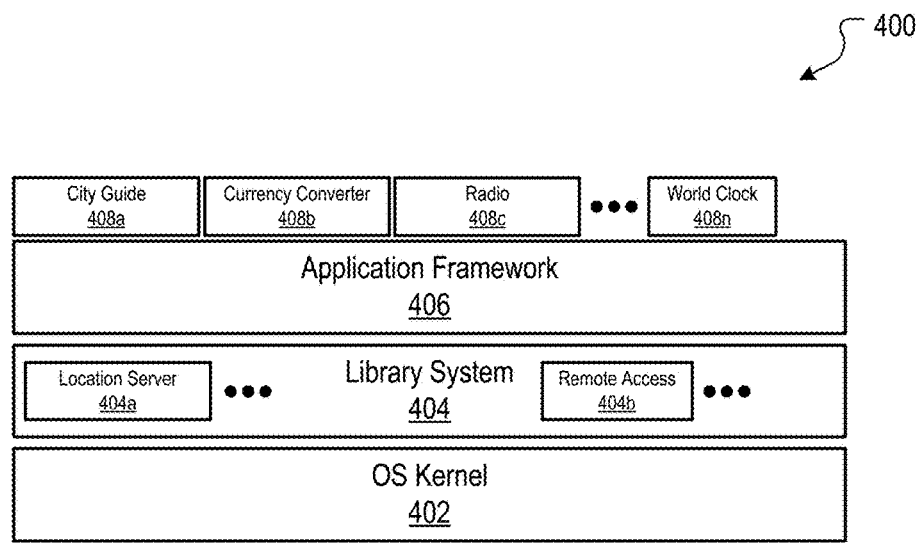
FIG. 4A illustrates an example implementation of a software stack for the mobile device of FIG. 1

FIG. 4A illustrates an example implementation of a software stack 400 for the mobile device of FIG. 1. In some implementations, the software stack 400 includes an operating system (OS) kernel 402 (e.g., a UNIX kernel), a library system 404, an application framework 406 and an application layer 408.

The OS kernel 402 manages the resources of the mobile device 100 and allows other programs to run and use these resources. Some examples of resources include a processor, memory and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100. When the mobile device 100 is turned on, a boot loader starts executing the kernel 102 in supervisor mode. The kernel then initializes itself and starts one or more processes for the mobile device 100, including a remote access process 404b for remote access management, as described in reference to FIG. 4B.

The library system 404 provides various services applications running in the application layer 408. Such services can include audio services, video services, database services, image processing services, graphics services, location-based services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIG. 1 (e.g., email, media player, Web browser, phone).

In some implementations, the applications layer 408 includes one or more location-based clients (e.g., applications, widgets). In the example shown, the applications layer 408 includes a City Guide client 408a, a currency converter client 408b, a radio client 408c and a world clock client 408n. Other location-based clients are possible, such as an information directory client (e.g., "Yellow Pages"), a music client, a weather client, a sports client, a movie/television client, a tidal watch client, a golf helper client, etc. Each of these location-based clients will be described in more detail in reference to FIGS. 5 and 6.

In some implementations, the location-based clients 408a-n can make calls to various services provided by the library system 404. The services can be accessed by the clients 408a-n through the application framework 406, for example. In the example shown, the library system 404 includes a location server 404a and a remote access process 404b. The location server 404a is a server process that communicates with a positioning system (e.g., a GPS receiver integrated or coupled to the mobile device 100) and serves the current position coordinates of the mobile device to the location-based clients 408a-n in response to a client request or other trigger event. In some implementations, the position coordinates are stored in a location in memory 350 (e.g., a reserved memory location), which can be accessed by clients 408a-n. The location server 404a can refresh the location in memory 350 on a periodic basis or in response to a trigger event.

Secure Communication Channel

Figure 4B:
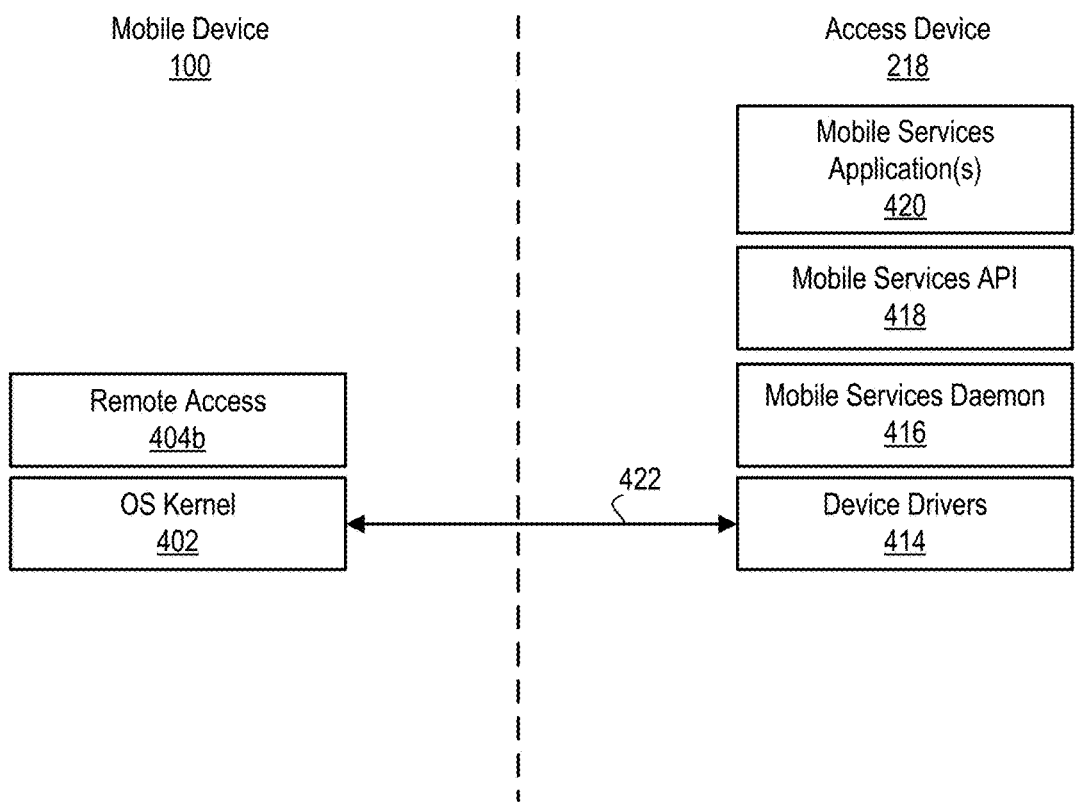
FIG. 4B illustrates an example implementation of a security process for remote access management over a secure communications channel.

FIG. 4B illustrates an example implementation of the remote access process 404b for remote access management over a communications channel 422 (e.g., a secure communications channel). In the example shown, the mobile device 100 is running the remote access process 404b, which communicates with the OS kernel 402. Any remote access requests made to the kernel 402 are intercepted by the process 404b, which is responsible for setting up communication sessions between the mobile device 100 and mobile services access device. In some implementations, the process 404b uses a cryptographic protocol, such as Secure Sockets Layer (SSL) or Transport Layer Security (TLS) to provide secure communication sessions between the mobile device 100 and an access point 218. The access point 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access point 218 includes device drivers 414, a mobile services daemon 416, a mobile services API 418 and one or more mobile service applications 420. The device drivers 414 are responsible for implementing a transport layer protocol, such as TCP/IP over USB. The mobile services daemon 416 listens (e.g. continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access point, which provides one or more user interfaces for allowing a user to interact with a remote service (e.g., activation service 270) over a network (e.g., the Internet, wireless network, peer-to-peer network, optical network, Ethernet, intranet). The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple, Inc. (Cupertino, Calif.). An example of mobile device 100 that uses the iTunes™ client is the iPod™ product developed by Apple Inc.

In an example operational mode, a user connects the mobile device 100 to the mobile access point using, for example, a USB cable. In other implementations, the mobile device 100 and access point 218 include wireless transceivers for establishing a wireless link (e.g., Wi-Fi). The drivers 414 and kernel 408 detect the connection and alert the remote access process 404b and mobile services daemon 416 of the connection status. Once the connection is established certain non-sensitive information can be passed from the mobile device 100 to the access point 218 (e.g., name, disk size, activation state) to assist in establishing a secure communication session.

In some implementations, the remote access process 404b establishes a secure communication session (e.g., encrypted SSL session) with the access point 218 by implementing a secure network protocol. For example, if using SSL protocol, the mobile device 100 and access point 218 will negotiate a cipher suite to be used during data transfer, establish and share a session key, and authenticate the access point 218 to the mobile device 100. In some implementations, if the mobile device 100 is password protected, the process 404b will not establish a session, and optionally alert the user of the reason for failure.

Once a secure session is successfully established, the mobile device 100 and the access point 218 can exchange sensitive information (e.g., passwords, personal information), and remote access to the mobile device 100 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 100 in a single session without the need to start a new session (or handshaking) for each service requesting access to the mobile device 100.

Location-Based Clients

Figure 5:
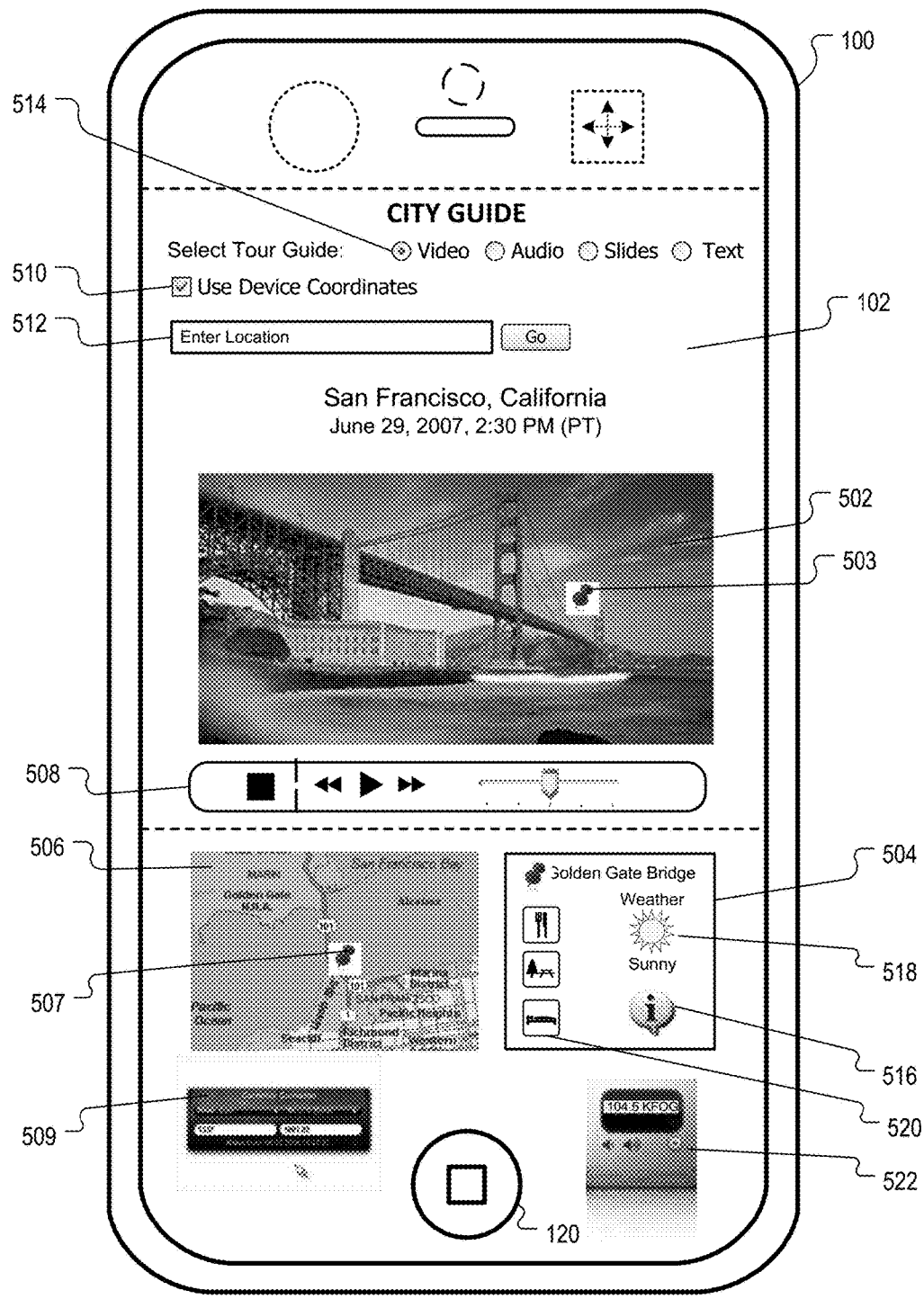
FIG. 5 is a block diagram of an example of a mobile device running location-based clients.

FIG. 5 is a block diagram of an example of a mobile device 100 running location-based clients. In the example shown, the mobile device 100 is running a City Guide client, and the mobile device 100 is located in San Francisco. The City Guide client presents various information related to San Francisco on the touch-sensitive display 102. In this example, the user selected a "Use Device Coordinates" option 510. Selecting this option engages a positioning system (e.g., a GPS receiver) that automatically determines the geographic location of the mobile device 100. In other implementations, the user can enter a location of interest in a search box 512.

In some implementations, the City Guide client allows a user to select one of four city guide modes: video mode 514, audio mode, slide mode and text mode. In this example, the user selected the video mode 514. The video mode 514 provides a video tour of San Francisco using a video display 502, which can be controlled by the user with video controls 508. In some implementations, placemarks (e.g., pushpins) are overlaid on the video at locations for which there is additional information available. The additional information can be presented on the touch-sensitive display 102 in a variety of ways, including as a map 506 or through a directory 504 or other user interface element or control (e.g., a menu system). In the example shown, the location currently shown in the video display 502 is the Golden Gate Bridge, which is marked with pushpin 503. The location is also marked on the map 506 with a corresponding pushpin 507. Some examples of locations that could be represented on a map by placemarks include businesses (e.g., restaurants, lodging), services (e.g., hospitals, police) and attractions (e.g., parks, picnic areas, monuments).

The directory 504 can include several user interface elements that can be selected (e.g., touched by a finger or stylus) to provide additional information related to the location marked by the pushpins 503 and 507, which in this example is the Golden Gate Bridge. In some implementations, the directory 504 can include user interface elements (e.g., buttons) that can be selected to display information about restaurants, lodging, parks, picnic areas, and/or businesses in the vicinity of the Golden Gate Bridge. The current weather 504 can also be shown, or any other information 516 relevant to the current location of the mobile device 100. In some implementations, advertisements for products or services related to the location and/or a mode (e.g., video mode) of the mobile device 100 can be presented on the mobile device 100 using display means (e.g., the touch-sensitive display 102) and/or audio means (e.g., a ring tone, text-to-speech, voicemail, an audio file).

Other city guide modes can also be selected by the user. For example, an audio mode can be selected to provide an audio tour of San Francisco, a slide mode can be selected to provide a slide show of San Francisco and a text mode can be selected to provide an electronic guide book of San Francisco. In some implementations, one or more modes can be combined to provide a multimedia presentation.

An advantage of the implementation just described is the ability of location-based clients to share information. In the example shown, the device coordinates were provided by the location server 404a. In some implementations, when the user selects the video mode 514, the mobile device 100 establishes a communication session with a remote service (e.g., a server) over a communications channel (e.g., wired or wireless link). The mobile device 100 provides the service with the position coordinates of the mobile device 100 and the service returns video, map and directory information to the mobile device 100, where it can be used by one or more location-based clients. In some implementations, the service provides presets or default values for loading into one or more location-based clients. As the user navigates the video guide with the controls 508, information regarding the current location is shared with a map service for rendering the map 506, and for determining which information to list in the directory 504.

Other location-based clients include a currency converter 509 which can be loaded with a preset for converting currency based on the location of the mobile device 100. In this example, the currency converter 509 allows the user to convert from a desired foreign currency to U.S. currency, or vice-versa. Another client can be a radio client 522 for streaming music by local artists and providing local concert information. The radio client could be loaded with presets for local radio stations. A "Yellow Pages" client could be loaded with local listings. A weather client could be loaded with local weather conditions, a world clock client could be loaded with the local time, a tidal watch client could be loaded with local tide tables (e.g., for use by surfers and fisherman), a golf helper client could be loaded with information about local golf courses (e.g., notes about the course conditions, pars, and strategies for playing the holes). All or some of these clients can operate on the mobile device 100 either alone or concurrently with other clients and share information. In some implementations, information from a first client can be used to change properties or attributes of a second location-based client (e.g., change a user interface associated with a client). In some implementations, activating a first location-based client causes a second location-based client to activate.

In some implementations, the user can interact with the clients and leave information which can be uploaded from the mobile device 100 to the service, where it can be accessed by or shared with other users. For example, the user could touch a pushpin 503, 507, and be provided with information regarding the location marked by the pushpin, 503, 507. Additionally, a text box or other input mechanism can be presented for allowing the user to enter information or attach content (e.g., digital photos), which can be sent to the service.

Figure 6:
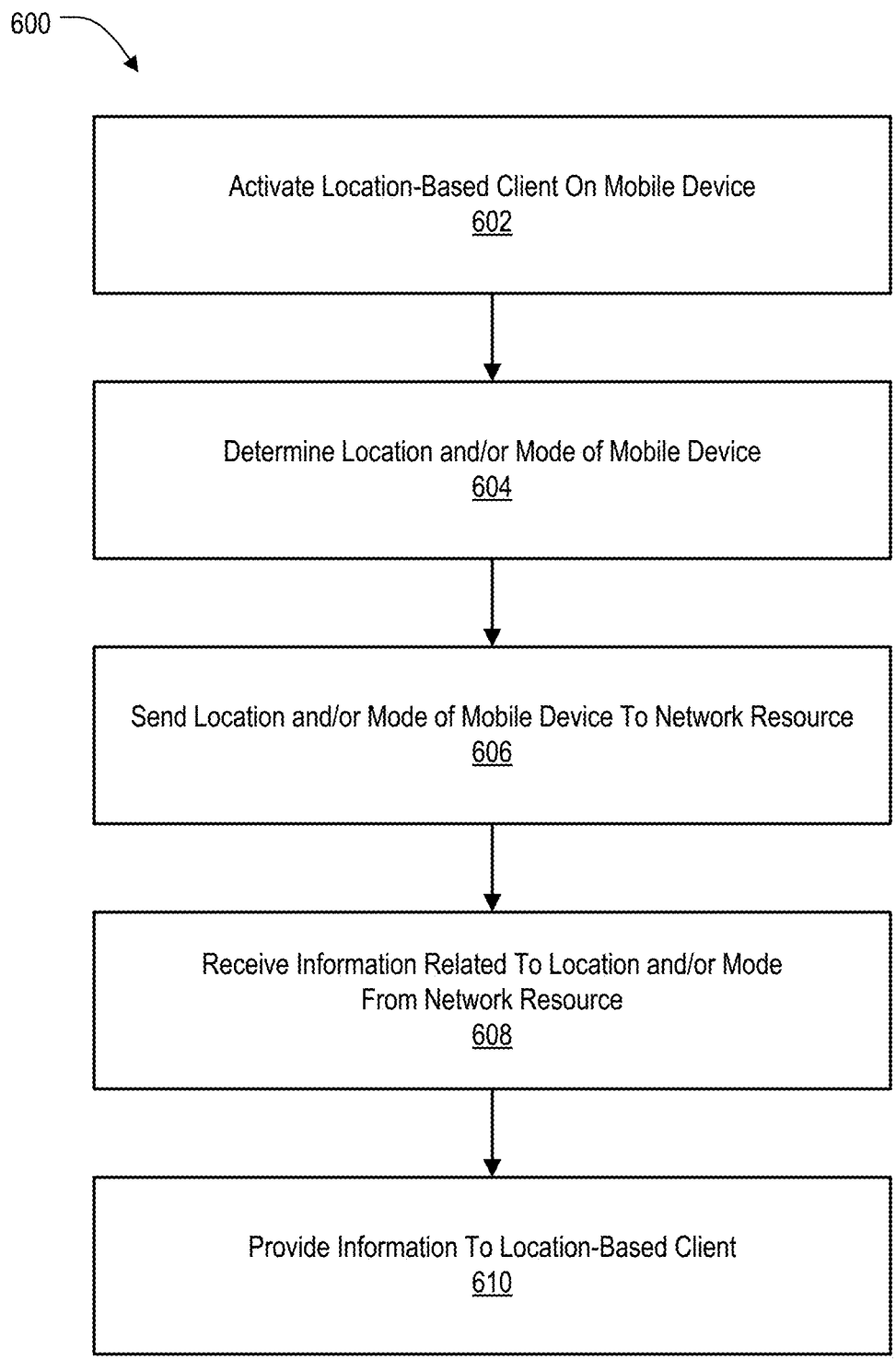
FIG. 6 is a flow diagram of a process for providing location-based information to location-based clients.

FIG. 6 is a flow diagram of a process 600 for providing location-based information (e.g., presets, defaults) to location-based clients. The process 600 begins when a location-based client is activated on the mobile device (602). The client can be activated manually by the user through, for example, the touch-sensitive display 102, or automatically by another client or trigger event.

The location and/or a mode of the mobile device is determined (604). The location (e.g., latitude, longitude) can be determined by a positioning system integrated in, or coupled to, the mobile device. The location can be determined independent of whether any client is currently active. The location and/or mode can be transmitted to one or more network resources (606). The network resources can use the location and/or mode to identify relevant information to send to the mobile device. In some implementations, the information can be selected based on the type of location-based client requesting the information.

A mode can indicate a state of the device or a context based on user activity. For example, if the user is browsing the web with the mobile device 100, then the mobile device 100 can provide a context mode descriptor to the service indicating that the user is currently in a browsing mode. The descriptor can also include search terms, a current web page URL, historical browsing patterns (e.g., URLs of cached web pages), bookmarks, etc. The service can use the descriptor to provide location-based services and/or content. In another example, if the user is taking digital pictures with the mobile device 100 (e.g., a camera integrated with a mobile phone), then the mobile device 100 can send a state mode descriptor to the service indicating that the user is currently taking a digital picture. The service can use the descriptor to provide location-based service, such a link to a camera store or a website where the user can upload and share their photos. In another example, an audio mode descriptor can be set to the service for indicating that the user is currently listening to music (e.g., operating an MP3 player). The service can use the audio mode descriptor to provide location-based services and/or content related to music. The audio mode descriptor could also include information about the song being played, such as title, artist, genre, etc.

The information is received by the mobile device (608), and provided to the location-based client requesting the information (610). In some implementations, the information can be updated periodically or in response to a trigger event while the location-based client is in operation.

In some implementations, each location-based client has a unique identifier that can be sent to the service, so that the service knows the type of client that will be using the information. In the example shown, the mobile device 100 can send one or more identifiers or descriptors to the service that indicate that the user is running a City Guide location-based client and that a video mode 514 has been selected. The service can then use the identifiers and the location information to download a video city guide for San Francisco.

In some implementations, a mobile device connected to a communications network may download a "tour" which is an association of data and locations. For example, a set of video, music, spoken or text content associated with various points on a path such as a road or trail for education, tourism, recreation, etc. In some implementations, a set of speeds or other vehicle related recommendations can also be downloaded. The recommendations can include, for example, suggested gear shifts associated with specific road segments for energy efficient driving and safety.

In some implementations, a mobile device in association with a location aware system (e.g., GPS, accelerometer, inertial measurement unit) can play data or content associated with a path or road as a tour is traveled by a person or vehicle. For example, video, music, spoken or text content may be presented as the user moves through the associated locations on a walk or drive. Alternatively, the vehicle related settings and recommendations (e.g., gear position, speed) may be displayed or presented as the vehicle moves through the various segments of the drive. In this embodiment, real time data from the vehicle (e.g., remaining charge, remaining fuel, etc.) may be used to fine tune or adjust the recommendations for the rest of the path traveled. Vehicle equipment can be used as a display system or presentation system. For example, the vehicle's GPS or other console can be used to display video or text and the vehicle's speaker system can be used to play audio. The mobile device can communicate tour data and content to vehicle equipment through a wired or wireless link (e.g., cable, Bluetooth link).

In some implementations, an accelerometer based system with a processor and a memory can improve location estimates during, for example, a walking or driving tour. Given an accurate start point and a route, the system can determine that a particular path or route is being followed based on detection of turns and direction of turns. As the vehicle or user moves up and down over highway ramps, major dips in the road, bridges, etc., the accelerometer can detect changes in vertical velocity and map a vertical velocity change profile of the vehicle to one of several possible routes. The velocity change profile can be combined with the turn information and/or GPS or other positioning technology (e.g., Wi-Fi, cell tower triangulation) to improve location estimates for the vehicle.

In some implementations, a tour's content may change depending on the direction and speed of the mobile device 100. For example, if a user is heading North, the mobile device 100 may present the user with material for destinations that the user is about to reach. Thus, in addition to receiving content based on current location, the service can determine (e.g., predict) the user's future locations based on sensor data, route traveled, landmarks, etc., and provide location-based services and/or content based on those future locations. In some implementations, the way content is presented to a user can change based on user's travel speed. For example, a speedy traveler could receive heading pages for prior saved media and a strolling traveler could see a complete presentation.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

After the mobile device is activated, in some implementations the remote access process 404b monitors remote access requests and sets-up and tears-down secure sessions as needed. Thus, in such an implementation all remote access requests are managed by a single remote access process 404b. If a user alters the mobile device (e.g., changing a SIM card), the remote access process 404b will detect the change and initiate an action, such as starting a new activation process 500, 600.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a mobile device, a location of the mobile device;

displaying, on a user interface of the mobile device, a map corresponding to a first location-based client executed on the mobile device, the map indicating the location of the mobile device;

receiving, through the first location-based client, a user input requesting information on the location of the mobile device indicated by the map;

transmitting, to a network resource, information about the user input;

in response to the transmission, receiving, from the network resource, information that includes map content corresponding to the first location-based client and vehicle-related content corresponding to a second location-based client executed on the mobile device, wherein some or all of the vehicle-related content is based on the user input through the first location-based client;

displaying, on the user interface of the mobile device, the map content corresponding to the first location-based client; and displaying, on the user interface of the mobile device concurrently with displaying the map content corresponding to the first location-based client, one or more user-selectable options corresponding to the second location-based client, the one or more user-selectable options including options for one or more vehicle-related services at the location of the mobile device indicated by the map.

2. The method of claim 1, further comprising:
receiving a second user input selecting an option of the one or more user-selectable options corresponding to the second location-based client; and
in response to the second user input, displaying additional information for a service corresponding to the selected option at the location of the mobile device.

3. The method of claim 2, wherein the selected option corresponds to a service of the one or more vehicle-related services, and wherein displaying additional information for the service corresponding to the selected option comprises displaying information on one or more routes traveled by one or more vehicles.

4. The method of claim 3, further comprising:
receiving real-time data from the one or more vehicles; and
adjusting the displayed information on the one or more routes traveled by the one or more vehicles using the real-time data.

5. The method of claim 2, wherein the selected option corresponds to a service of the one or more vehicle-related services, and wherein displaying additional information for the service corresponding to the selected option comprises providing location estimates for one or more vehicles.

6. The method of claim 5, wherein providing location estimates for one or more vehicles comprises:
receiving information on one or more of a vehicle velocity change profile, vehicle turn information, or positioning technology; and
adjusting the location estimates using the received information.

7. The method of claim 1, wherein displaying the one or more user-selectable options corresponding to the second location-based client comprises:
displaying advertisements for products or services at the location of the mobile device.

8. A non-transitory computer-readable medium storing one or more instructions that, when executed by one or more processors, cause the one or more processors to perform operations comprising:
determining, by a mobile device, a location of the mobile device;
displaying, on a user interface of the mobile device, a map corresponding to a first location-based client executed on the mobile device, the map indicating the location of the mobile device;
receiving, through the first location-based client, a user input requesting information on the location of the mobile device indicated by the map;
transmitting, to a network resource, information about the user input;
in response to the transmission, receiving, from the network resource, information that includes map content corresponding to the first location-based client and vehicle-related content corresponding to a second location-based client executed on the mobile device, wherein some or all of the vehicle-related content is based on the user input through the first location-based client;
displaying, on the user interface of the mobile device, the map content corresponding to the first location-based client; and
displaying, on the user interface of the mobile device concurrently with displaying the map content corresponding to the first location-based client, one or more user-selectable options corresponding to the second location-based client, the one or more user-selectable options including options for one or more vehicle-related services at the location of the mobile device indicated by the map.

9. The non-transitory computer-readable medium of claim 8, wherein the operations further comprise:
receiving a second user input selecting an option of the one or more user-selectable options corresponding to the second location-based client; and
in response to the second user input, displaying additional information for a service corresponding to the selected option at the location of the mobile device.

10. The non-transitory computer-readable medium of claim 9, wherein the selected option corresponds to a service of the one or more vehicle-related services, and wherein displaying additional information for the service corresponding to the selected option comprises displaying information on one or more routes traveled by one or more vehicles.

11. The non-transitory computer-readable medium of claim 10, wherein the operations further comprise:
receiving real-time data from the one or more vehicles; and
adjusting the displayed information on the one or more routes traveled by the one or more vehicles using the real-time data.

12. The non-transitory computer-readable medium of claim 9, wherein the selected option corresponds to a service of the one or more vehicle-related services, and wherein displaying additional information for the service corresponding to the selected option comprises providing location estimates for one or more vehicles.

13. The non-transitory computer-readable medium of claim 12, wherein providing location estimates for one or more vehicles comprises:

receiving information on one or more of a vehicle velocity change profile, vehicle turn information, or positioning technology; and adjusting the location estimates using the received information.

14. The non-transitory computer-readable medium of claim 8, wherein displaying the one or more user-selectable options corresponding to the second location-based client comprises:

displaying advertisements for products or services at the location of the mobile device.

15. A mobile device comprising:

one or more processors; and memory storing instructions that, when executed by the one or more processors, cause the one or more processors to perform operations comprising:

determining, by the mobile device, a location of the mobile device;

displaying, on a user interface of the mobile device, a map corresponding to a first location-based client executed on the mobile device, the map indicating the location of the mobile device;

receiving, through the first location-based client, a user input requesting information on the location of the mobile device indicated by the map;

transmitting, to a network resource, information about the user input;

in response to the transmission, receiving, from the network resource, information that includes map content corresponding to the first location-based client and vehicle-related content corresponding to a second location-based client executed on the mobile device, wherein some or all of the vehicle-related content is based on the user input through the first location-based client;

displaying, on the user interface of the mobile device, the map content corresponding to the first location-based client; and displaying, on the user interface of the mobile device concurrently with displaying the map content corresponding to the first location-based client, one or more user-selectable options corresponding to the second location-based client, the one or more user-selectable options including options for one or more vehicle-related services at the location of the mobile device indicated by the map.

16. The mobile device of claim 15, wherein the operations further comprise:

receiving a second user input selecting an option of the one or more user-selectable options corresponding to the second location-based client; and in response to the second user input, displaying additional information for a service corresponding to the selected option at the location of the mobile device.

17. The mobile device of claim 16, wherein the selected option corresponds to a service of the one or more vehicle-related services, and wherein displaying additional information for the service corresponding to the selected option comprises displaying information on one or more routes traveled by one or more vehicles.

18. The mobile device of claim 17, wherein the operations further comprise:

receiving real-time data from the one or more vehicles; and adjusting the displayed information on the one or more routes traveled by the one or more vehicles using the real-time data.

19. The mobile device of claim 16, wherein the selected option corresponds to a service of the one or more vehicle-related services, and wherein displaying additional information for the service corresponding to the selected option comprises providing location estimates for one or more vehicles.

20. The mobile device of claim 19, wherein providing location estimates for one or more vehicles comprises:

receiving information on one or more of a vehicle velocity change profile, vehicle turn information, or positioning technology; and adjusting the location estimates using the received information.

21. The mobile device of claim 15, wherein displaying the one or more user-selectable options corresponding to the second location-based client comprises:

displaying advertisements for products or services at the location of the mobile device.

* * * * *